(12) United States Patent
Hwang et al.

(10) Patent No.: US 8,411,546 B2
(45) Date of Patent: Apr. 2, 2013

(54) INFORMATION STORAGE MEDIUM, RECORD REPRODUCING DEVICE, AND RECORD REPRODUCING METHOD

(75) Inventors: Sung-Hee Hwang, Suwon-si (KR); In-Oh Hwang, Seongnam-si (KR); Jung-Wan Ko, Suwon-si (KR); Kyung-Geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/208,405

(22) Filed: Aug. 12, 2011

(65) Prior Publication Data

US 2011/0310715 A1 Dec. 22, 2011

Related U.S. Application Data

(63) Continuation of application No. PCT/KR2010/000927, filed on Feb. 12, 2010.

(60) Provisional application No. 60/161,895, filed on Mar. 20, 2009, provisional application No. 61/224,948, filed on Jul. 13, 2009.

(30) Foreign Application Priority Data

Feb. 13, 2009 (KR) .................. 10-2009-0012119
Feb. 11, 2010 (KR) .................. 10-2010-0012900

(51) Int. Cl.
*G11B 7/00* (2006.01)

(52) U.S. Cl. ..................... 369/94; 369/53.17

(58) Field of Classification Search ................ 369/47.53, 369/275.3, 47.1, 47.27, 53.13, 94, 53.22, 369/53.17, 275.2

See application file for complete search history.

(56) References Cited

U.S. PATENT DOCUMENTS

| | | | |
|---|---|---|---|
| 7,599,266 B2 * | 10/2009 | Suh ......................... | 369/47.53 |
| 8,077,561 B2 * | 12/2011 | Park et al. .................. | 369/30.04 |
| 2007/0002483 A1 | 1/2007 | Suh | |

FOREIGN PATENT DOCUMENTS

| | | |
|---|---|---|
| EP | 1 244 096 A2 | 9/2002 |
| EP | 1 492 098 A2 | 12/2004 |
| EP | 1 732 066 A1 | 12/2006 |
| JP | 2007-323702 | 12/2007 |
| JP | 2008-108388 | 5/2008 |
| KR | 10-2005-0117318 | 12/2005 |
| KR | 10-2006-0016774 | 2/2006 |
| KR | 10-2006-0017971 | 2/2006 |
| WO | WO 2008/007898 A1 | 1/2008 |

OTHER PUBLICATIONS

European Search Report issued Nov. 6, 2012 in counterpart European Patent Application No. 10741429.4-1247, partial supplementary (11 pages, in English).

* cited by examiner

*Primary Examiner* — Nabil Hindi
(74) *Attorney, Agent, or Firm* — NSIP Law

(57) ABSTRACT

Provided is an information recording medium including a plurality of recording layers. Each recording layer may comprise at least one optical power control (OPC) area, and each OPC area is allocated so as not to overlap an adjacent layer in a given radius.

4 Claims, 23 Drawing Sheets

FIG. 11

| | 1110 | 1120 | 1130 |
|---|---|---|---|
| | 25GB/L | 32GB/L | 33.4GB/L |
| Track Pitch = 0.32 um, RUB size = 1932*498 = 962136 bits, pi = 3.141592 | | | |
| Start radius of Information Zone/PZ1 | 22.2 mm | 22.2 mm | 22.2 mm |
| Start radius of Recordable Zone/PIC | 22.512 mm | 22.512 mm | 22.512 mm |
| Data Zone | 24 ~ 58 mm | 24 ~ 58 mm | 24 ~ 58 mm |
| Channel bit length | 74.50 nm | 58.20nm | 55.80nm |
| Data Zone Capacity | 381856 RUBs (= 25.025GB) | 488802 RUBs (=32.034GB) | 509826 RUBs (=33.412GB) |
| Lead-in Capacity (22.512 ~ 24 mm) | 9479 RUBs | 12134 RUBs | 12656 RUBs |

FIG. 12

| | 25GB/L <br> 1110 | 32GB/L (QL) <br> 1120 | 33.4GB/L (TL) <br> 1130 |
|---|---|---|---|
| Lead-in Capacity (22.512~24) | 9479 RUBs | 12134 RUBs | 12656 RUBs |
| Lead-in Information (size) | INFO1(256), INFO2(256),TDMA(2048),OPC(2048),OPC Buffer(X) | | |
| Needed Lead-in Capacity | 9472 RUBs = 256+256+2048+2048*4+826*3 | 13230 RUBs = 256+256+2048+2048*4+826*3 | 10426 RUBs = 256+256+2048+2048*3+861*2 |
| | Good | No Good | Good |

FIG. 14

| | L0 | L1 | L2 | L3 |
|---|---|---|---|---|
| INFO 2 (128) | PAC 2(32) | PAC 2(32) | PAC 2(32) | PAC 2(32) |
| | DMA 2(32) | DMA 2(32) | DMA 2(32) | DMA 2(32) |
| | CD 2(32) | CD 2(32) | CD 2(32) | CD 2(32) |
| 1370 | Buffer 2(32) | Buffer 2(32) | Buffer 2(32) | Buffer 2(32) |
| | Pre-write Area(32) | Pre-write Area(32) | Pre-write Area(32) | Pre-write Area(32) |
| INFO 1 (256) | Drive Area(128) | Drive Area(128) | Drive Area(128) | Drive Area(128) |
| | DMA 1(32) | DMA 1(32) | DMA 1(32) | DMA 1(32) |
| | CD 1(32) | CD 1(32) | CD 1(32) | CD 1(32) |
| 1360 | PAC 1(32) | PAC 1(32) | PAC 1(32) | PAC 1(32) |

FIG. 15

| | L0 | L1 | L2 | L3 |
|---|---|---|---|---|
| INFO 2 (128) | PAC 2(32) | PAC 2(32) | PAC 2(32) | PAC 2(32) |
| | DMA 2(32) | DMA 2(32) | DMA 2(32) | DMA 2(32) |
| 1370 | CD 2(32) | CD 2(32) | CD 2(32) | CD 2(32) |
| | Buffer 2(32) | Buffer 2(32) | Buffer 2(32) | Buffer 2(32) |
| INFO 1 (256) | Buffer 1(32) | Buffer 1(32) | Buffer 1(32) | Buffer 1(32) |
| | Drive Area(32) | Drive Area(32) | Drive Area(32) | Drive Area(32) |
| | Reserved(96) | Reserved(96) | Reserved(96) | Reserved(96) |
| 1360 | DMA 1(32) | DMA 1(32) | DMA 1(32) | DMA 1(32) |
| | CD 1(32) | CD 1(32) | CD 1(32) | CD 1(32) |
| | PAC 1(32) | PAC 1(32) | PAC 1(32) | PAC 1(32) |

FIG. 17

|  | L0 | L1 | L2 |
|---|---|---|---|
| INFO 2 (256) | Reserved(128) | Reserved(128) | Reserved(128) |
|  | PAC 2(32) | PAC 2(32) | PAC 2(32) |
| 1660 | DMA 2(32) | DMA 2(32) | DMA 2(32) |
|  | CD 2(32) | CD 2(32) | CD 2(32) |
|  | Buffer 2(32) | Buffer 2(32) | Buffer 2(32) |
| INFO 1 (256) | Pre-write Area(32) | Pre-write Area(32) | Pre-write Area(32) |
|  | Drive Area(128) | Drive Area(128) | Drive Area(128) |
| 1650 | DMA 1(32) | DMA 1(32) | DMA 1(32) |
|  | CD 1(32) | CD 1(32) | CD 1(32) |
|  | PAC 1(32) | PAC 1(32) | PAC 1(32) |

FIG. 18

| | L0 | L1 | L2 |
|---|---|---|---|
| INFO 2 (256) | Reserved(128) | Reserved(128) | Reserved(128) |
| 1660 | PAC 2(32) | PAC 2(32) | PAC 2(32) |
| | DMA 2(32) | DMA 2(32) | DMA 2(32) |
| | CD 2(32) | CD 2(32) | CD 2(32) |
| | Buffer 2(32) | Buffer 2(32) | Buffer 2(32) |
| INFO 1 (256) | Buffer 1(32) | Buffer 1(32) | Buffer 1(32) |
| 1650 | Drive Area(32) | Drive Area(32) | Drive Area(32) |
| | Reserved(96) | Reserved(96) | Reserved(96) |
| | DMA 1(32) | DMA 1(32) | DMA 1(32) |
| | CD 1(32) | CD 1(32) | CD 1(32) |
| | PAC 1(32) | PAC 1(32) | PAC 1(32) |

INFORMATION STORAGE MEDIUM, RECORD REPRODUCING DEVICE, AND RECORD REPRODUCING METHOD

CROSS REFERENCE TO RELATED APPLICATION(S)

This application is a continuation of International Patent Application No. PCT/KR2010/000927, filed on Feb. 12, 2010, which claims the benefit of U.S. Provisional Patent Application No. 61/161,895, filed on Mar. 20, 2009, and U.S. Provisional Patent Application No. 61/224,948 filed on Jul. 13, 2009, in the United States Patent and Trademark Office, and the benefit of Korean Patent Application No. 10-2009-0012119, filed on Feb. 13, 2009, and Korean Patent Application No. 10-2010-0012900 filed on Feb. 11, 2010, in the Korean Intellectual Property Office, the entire disclosures of which are incorporated herein by reference for all purposes.

BACKGROUND

1. Field

The following description relates to an information recording medium, a recording/reproducing apparatus, and a recording/reproducing method, and more particularly, to a high capacity information recording medium that includes a plurality of recording layers.

2. Description of Related Art

To achieve a high capacity information storage medium or to transmit information via a wire or wireless network, various methods such as recording data on an information storage medium at a high density or in a multilayer structure are being developed. Because an information storage medium has a multilayer structure, each layer of an information storage medium typically has an area for disc recording/reproducing management.

An example of an area for disc recording/reproducing management is an optical power control (OPC) area. An OPC area is a test area for calibrating power, and is used to find an appropriate power level for recording or reproducing data on or from an information storage medium. Because a test is performed to find an optimal power level, power higher than a normal recording power may be applied, and thus, areas of neighboring layers may be damaged. Also, an area of a layer adjacent to an OPC area (in particular, a lower layer in a proceeding direction of an optical beam) may be damaged. As such, a multilayer structure typically uses multiple OPC areas. For example, a Blu-ray disc (BD) has OPC areas for a single layer (SL) or dual layers (DL), and additional OPC areas for a triple layer (TL) or a quadruple layer (QL) disc.

SUMMARY

In one general aspect, there is provided an information recording medium including at least three recording layers, wherein each of the at least three recording layers comprises at least one optical power control (OPC) area, and each OPC area of the at least three recording layers is allocated so as not to overlap an OPC area of an adjacent recording layer within a certain radius.

The at least three recording layers may each comprise a buffer area that is adjacent to each OPC area, and an OPC area of a recording layer may be located between two of the at least three recording layers and comprises a buffer area that is adjacent to both an inside and an outside of the OPC area.

The buffer area may have a size greater than a physical area corresponding to interlayer eccentricity according to a disc standard.

Each OPC area may be arranged in a lead-in area of a recording layer.

In another aspect, there is provided an information recording medium including at least three recording layers, wherein at least one recording layer comprises a permanent information and control data (PIC) area, at least two recording layers have no PIC area, and OPC areas are allocated to the at least two recording layers that have no PIC area and are arranged in different radiuses, and at least one of the OPC areas allocated to the at least two recording layers that have no PIC area is allocated in a radius to which the PIC area is allocated in the at least one recording layer comprising the PIC area, and at least one other OPC area is allocated to partially overlap the radius to which the PIC area is allocated in the at least one recording layer comprising the PIC area.

In another aspect, there is provided an information recording medium including at least three recording layers comprising at least two recording layers that have PIC areas allocated therein, and at least one recording layer that has no PIC area allocated therein, wherein an OPC area allocated to the at least one recording layer that has no PIC area is allocated to a radius that is different from radiuses to which OPC areas allocated to the at least two recording layers comprising the PIC areas are allocated, the PIC areas allocated to the at least two recording layers are allocated to the same radius, and the OPC area allocated to the at least one recording layer that has no PIC area partially overlaps with or is allocated in the radius to which at least one of the PIC areas allocated to the at least two recording layers is allocated.

In another aspect, there is provided an apparatus for recording/reproducing data on/from an information recording medium comprising at least three recording layers, the apparatus including a pickup for recording/reproducing data with respect to the information recording medium, wherein each of the at least three recording layers comprise at least one OPC area, and each OPC area is allocated so as not to overlap an OPC area of an adjacent recording layer with respect to a radius, and a control unit for controlling the pickup to record/reproduce the data with respect to the information recording medium.

In another aspect, there is provided an information recording medium including a user data area for recording user data, and a spare area for replacing a defect detected in the user data area, wherein a tracking direction of the user data area is opposite to a direction in which the spare area is used, and when data is recorded in contiguous replacement clusters of the spare area to replace contiguous defect clusters detected in the user data area, replacement clusters of the contiguous replacement clusters are used in a tracking direction.

In another aspect, there is provided an apparatus for recording data on an information recording medium, the apparatus including a pickup for recording/reproducing the data with respect to the information recording medium comprising a user data area for recording user data, and a spare area for replacing a defect detected in the user data area, wherein a tracking direction of the user data area is opposite to a direction in which the spare area is used, and a control unit for, in response to data being recorded in contiguous replacement clusters of the spare area to replace contiguous defect clusters detected in the user data area, controlling the pickup to record the data from a first replacement cluster among the contiguous replacement clusters in a tracking direction.

In another aspect, there is provided an apparatus for repro- ducing data from an information recording medium, the apparatus including a pickup for recording/reproducing data with respect to the information recording medium comprising a user data area for recording user data, and a spare area for replacing a defect detected in the user data area, wherein a tracking direction of the user data area is opposite to a direction in which the spare area is used, and a control unit for, in response to data being read from contiguous replacement clusters of the spare area to replace contiguous defect clusters detected in the user data area, controlling the pickup to read the data from a first replacement cluster among the contiguous replacement clusters in a tracking direction.

In another aspect, there is provided a method of recording data on an information recording medium comprising a user data area for recording user data, and a spare area for replacing a defect detected in the user data area, wherein a tracking direction of the user data area is opposite to a direction in which the spare area is used, the method including, in response to data being recorded in contiguous replacement clusters of the spare area to replace contiguous defect clusters detected in the user data area, recording the data from a first replacement cluster among the contiguous replacement clusters in a tracking direction.

In another aspect, there is provided a method of reproducing data from an information recording medium comprising a user data area for recording user data, and a spare area for replacing a defect detected in the user data area, wherein a tracking direction of the user data area is opposite to a direction in which the spare area is used, the method including, in response to data being reproduced from contiguous replacement clusters of the spare area to replace contiguous defect clusters detected in the user data area, reproducing the data from a first replacement cluster among the contiguous replacement clusters in a tracking direction.

Other features and aspects may be apparent from the following detailed description, the drawings, and the claims.

BRIEF DESCRIPTION OF THE DRAWINGS

FIG. 11 is a table illustrating an example of reference disc parameters with respect to a capacity of each layer.

FIG. 12 is a reference table illustrating an example of an insufficient inner zone capacity of a high capacity blu-ray disc-recordable quadruple layer (HC BD-R QL).

FIG. 14 is a table illustrating an example of INFO 1 and INFO 2 of a HC BD-rewritable (RE) disc.

FIG. 15 is a table illustrating another example of INFO 1 and INFO 2 of a HC BD-RE disc.

FIG. 17 is a table illustrating another example of INFO 1 and INFO 2 of a HC BD-rewritable (RE) disc.

FIG. 18 is a table illustrating another example of INFO 1 and INFO 2 of a HC BD-RE disc.

Figure 1:
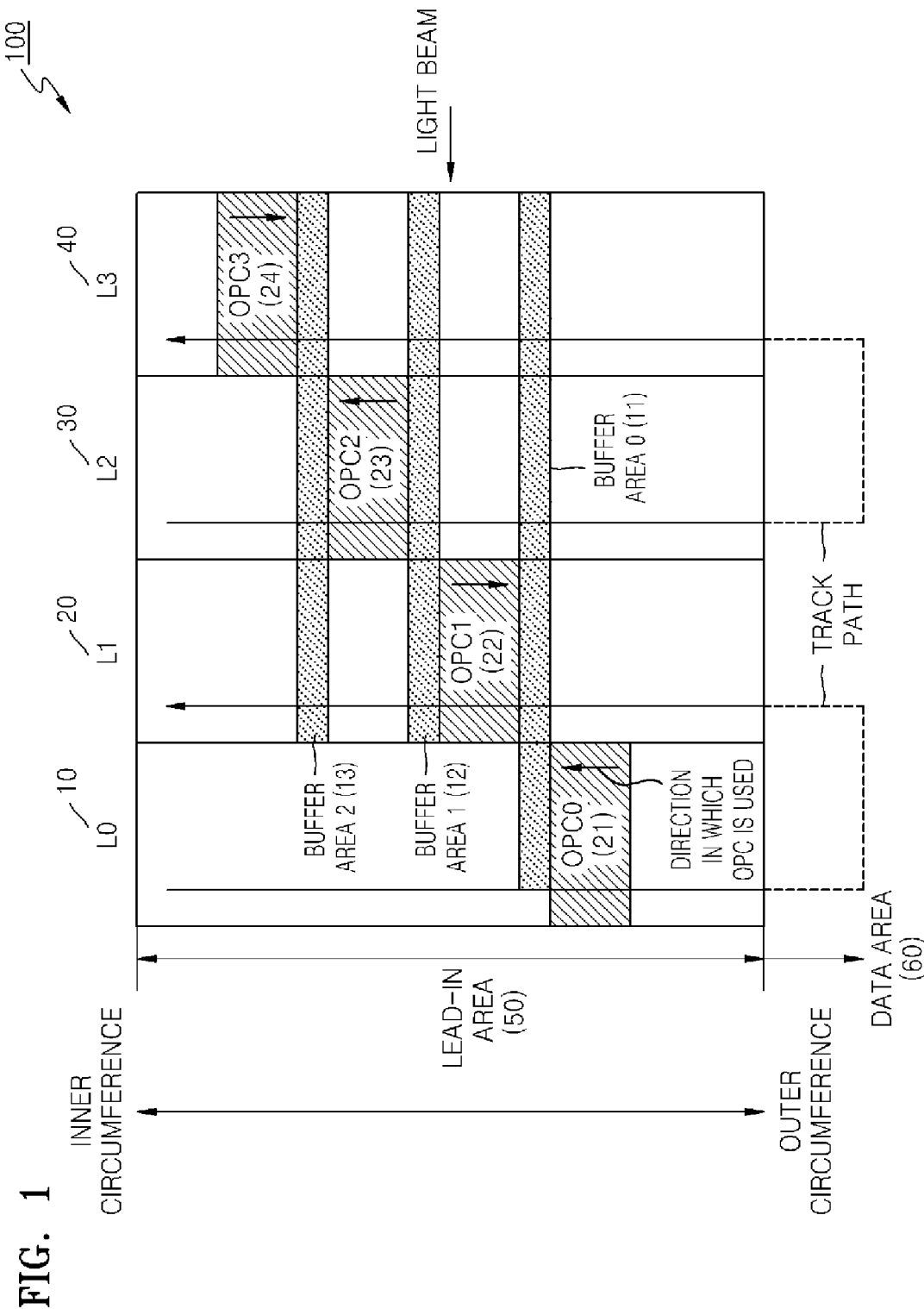
FIG. 1 is a diagram illustrating an example of a layout of a disc for allocating optical power control (OPC) areas to a multi layer information storage medium in consideration of eccentricity.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Various examples describe an apparatus and method for efficiently arranging optical power control (OPC) areas in an information recording medium, thereby reducing an influence of an OPC operation when recorded data is reproduced. Various examples describe an information recording medium, apparatus, and method for effectively managing a contiguous defect replacement when a direction in which a user area is used is the opposite of a direction in which a spare area is used.

The information recording medium may include at least three recording layers, and each of the at least three recording layers may include at least one optical power control (OPC) area. Each OPC area may be allocated so as not to overlap with an OPC area of an adjacent recording layer with respect to a radius.

At least one recording layer may include a permanent information and control data (PIC) area, at least two recording layers that have no PIC area, and OPC areas allocated to the at least two recording layers that have no PIC area may be arranged in different radiuses. For example, at least one of the OPC areas allocated to the at least two recording layers having no PIC area may be allocated in a radius to which the PIC area is allocated in the at least one recording layer including the PIC area. At least one other OPC area may be allocated to partially overlap in the radius to which the PIC area is allocated in the at least one recording layer including the PIC area.

The information recording medium may include a user data area for recording user data and a spare area for replacing a defect detected in the user data area. A tracking direction of the user data area and a direction in which the spare area is used may be opposite to each other. If data is recorded in contiguous replacement clusters of the spare area to replace contiguous defect clusters detected in the user data area, replacement clusters of the contiguous replacement clusters may be used in a tracking direction.

According to various examples, optical power control (OPC) areas are efficiently arranged in an information recording medium including three or more layers, thereby reducing an influence of an OPC operation when recorded data is reproduced and actively reproducing data recorded in another layer.

In a multi layer information storage medium, each layer may have at least one optical power control (OPC) area toward an inner circumference and that is allocated so as not to overlap the OPC area of a neighboring layer in the same radius.

An OPC area of each layer may have at least one neighboring buffer zone on the layer, and an OPC area between two OPC areas from among a plurality of two OPC areas corresponding to the number of layers may have neighboring buffer zones in the same radius of a disc.

A buffer zone may have a size greater than a physical area corresponding to interlayer eccentricity according to a disc standard. For example, if it is defined that a disc has to be manufactured with an error of less than a 0.1 mm radius of interlayer eccentricity, the buffer zone may have a size equal to or greater than the 0.1 mm radius.

Interlayer eccentricity refers to a radius error between areas in the same radius, from a standard point (e.g., the center of a completely manufactured disc). For example, if it is defined that a data zone of each recording layer starts from a 24 mm radius, due to manufacturing characteristics, the data zone may not always start in the exact position. Also, because a plurality of recording layers are bonded to manufacture a multilayer disc, an error may exist between layers.

Accordingly, if each recording layer generally has an allowable error of ±0.05 mm and has to start from a 24.0±0.05 mm radius, one recording layer may have a data zone that starts from a 23.95 mm radius from a standard point of a completely manufactured disc, and another recording layer may have a data zone that starts from a 24.05 mm radius. In this example, maximum interlayer eccentricity between recording layers may be 0.1 mm. Due to interlayer eccentricity, when OPC areas are allocated, buffer zones have to be allocated in consideration of interlayer eccentricity between neighboring layers. In particular, the influence of an optical beam on lower layers in a proceeding direction of the optical beam cannot be ignored.

FIG. 1 illustrates an example of a layout for allocating optical power control (OPC) areas to multi layer information storage medium in consideration of eccentricity.

Referring to FIG. 1, the information storage medium includes four recording layers such as L0 10, L1 20, L2 30, and L3 40. An optical beam is incident on the L3 40. In general, OPC areas may be aligned on a lead-in area and also in a lead-out area. However, in FIG. 1, OPC areas such as OPC0 21, OPC1 22, OPC2 23, and OPC3 24 are aligned on a lead-in area 50 that is toward an inner circumference. In this example, the OPC0 21 is aligned on the L0 10, the OPC1 22 is aligned on the L1 20, the OPC2 23 is aligned on the L2 30, and the OPC3 24 is aligned on the L3 40. The OPC areas aligned on two neighboring layers are aligned so as not to overlap each other in a radial direction.

For example, the OPC0 21 and OPC1 22 of the L0 10 and L1 20 that are two neighboring layers are aligned with a gap by a buffer zone0 11 in consideration of interlayer eccentricity such that they do not overlap each other in the radial direction. Likewise, the OPC1 22 and OPC2 23 of the L1 20 and L2 30 are aligned with a gap by a buffer zone1 12 in consideration of interlayer eccentricity such that they do not overlap each other in the radial direction. Also, the OPC2 23 and OPC3 24 of the L2 30 and L3 40 are aligned with a gap by a buffer zone2 13 in consideration of interlayer eccentricity such that they do not overlap each other in the radial direction.

Neighboring buffer zones are aligned on inner and outer portions of an OPC area of a layer that is aligned between two layers that have OPC areas. For example, the neighboring buffer zone1 12 and buffer zone2 13 are aligned on inner and outer portions of the OPC2 23 of the L2 30 that is aligned between the L1 20 having the OPC1 22 and the L3 40 having the OPC3 24. Also, the neighboring buffer zone0 11 and buffer zone1 12 are aligned on inner and outer portions of the OPC1 22 of the L1 20 that is aligned between the L0 10 having the OPC0 21 and the L2 30 having the OPC2 23.

Buffer zones may have a size that is equal to or greater than that of a physical area corresponding to interlayer eccentricity that is defined by a disc standard. For example, if a disc should be manufactured to have an error of interlayer eccentricity between neighboring layers within a 0.1 mm radius, buffer zones may have a size that is equal to or greater than the 0.1 mm radius.

In FIG. 1, data zone 60 starts at a point at which the lead-in area 50 that is toward the inner circumference, ends. In FIG. 1, the information storage medium has an opposite track path (OTP). In the example of FIG. 1, a track path starts from an inner circumference of the L0 10 and proceeds toward an outer circumference of the L0 10, and starts from an outer circumference of the L1 20 and proceeds toward an inner circumference of the L1 20. Likewise, a track path starts from an inner circumference of the L2 30 and proceeds toward an outer circumference of the L2 30, and starts from an outer circumference of the L3 40 and proceeds toward an inner circumference of the L3 40. In this example, a direction for using an OPC area for each layer, i.e., a data recording direction in an OPC area, is opposite to a direction of a track path. For example, the track path on the L0 10 is from the inner circumference toward the outer circumference whereas the direction in which the OPC0 21 is used is from the outer circumference toward the inner circumference.

Accordingly, OPC areas may be aligned in various ways on the L0 10 through L3 40. If OPC areas are aligned on the L2 30 and L3 40 in a way that OPC areas are aligned on the L0 10 and L1 20, a disc may be more conveniently used in terms of recording management.

FIGS. 2 through 10 illustrate examples of a layout of a Blu-ray disc-recordable (BD-R)/Blu-ray disc-rewritable (BD-RE) 32 GB/L or 33 GB/L triple layer (TL) or quadruple layer (QL). A layer that is close to a disc surface, i.e., the L3, is referred to as an upper layer, and a layer that is close to the L0 is referred to as a lower layer. Areas of lower layers in the same radius as an OPC area allocated to an upper layer are all reserved.

In FIGS. 2 through 10, numbers in brackets represent sizes of areas and are only marked on areas for description. The sizes of areas are merely examples and should not be construed as limiting the sizes of various areas.

Figure 2:
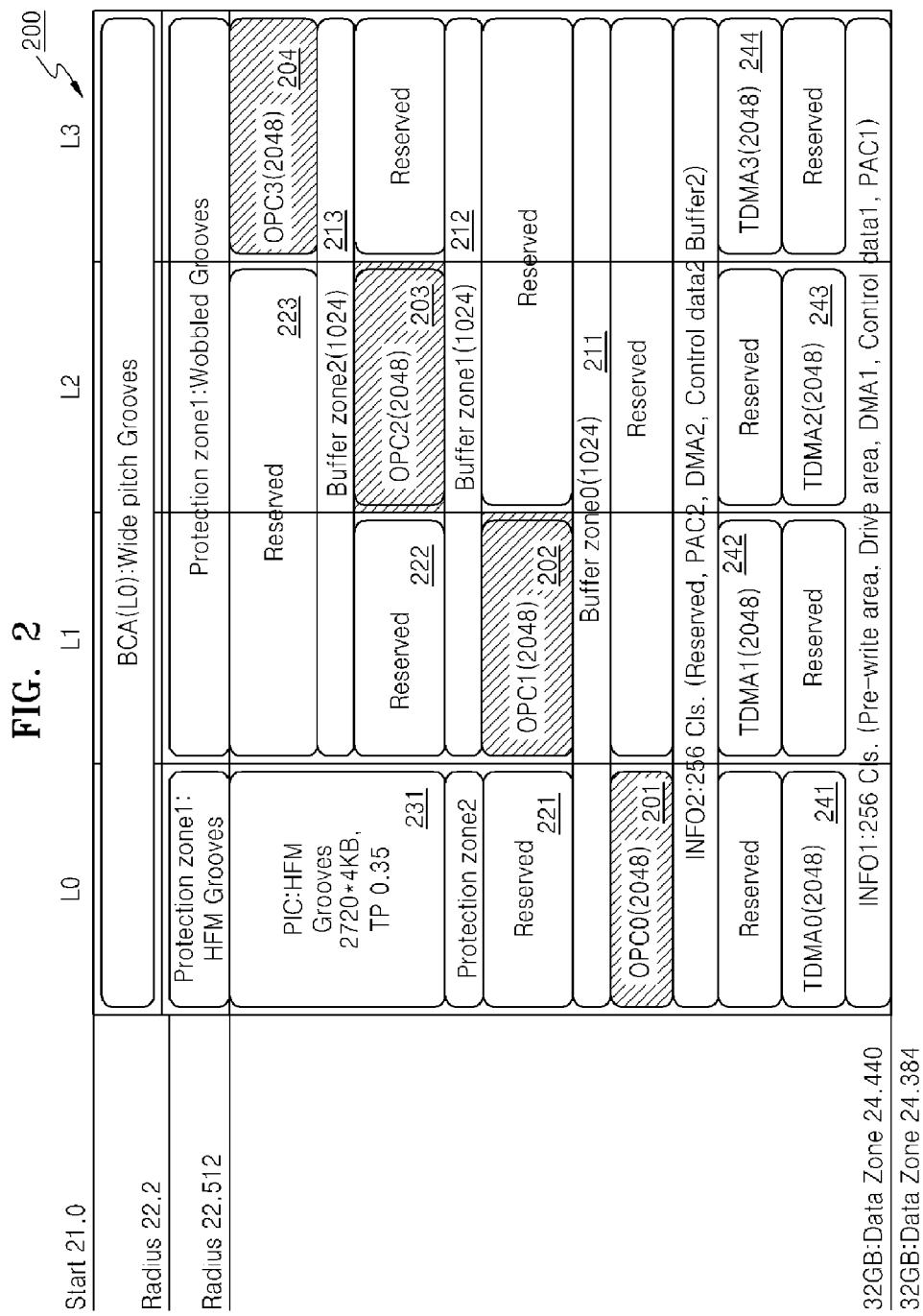
FIG. 2 is a diagram illustrating a first example of a layout of a Blu-ray disc recordable (BD-R) triple layer (TL)/quadruple layer (QL) (32 GB/L or 33 GB/L).

FIG. 2 shows a first example of a layout of a BD-R TL/QL (32 GB/L or 33 GB/L).

Referring to FIG. 2, OPC0 201, OPC1 202, OPC2 203, and OPC3 204 are aligned on L0 through L3, respectively, and buffer zone0 211, buffer zone1 212, and buffer zone2 213 are aligned in consideration of interlayer eccentricity to prevent overlapping of the OPC areas of neighboring layers. Areas of lower layers in the same radius as an OPC area allocated to an upper layer are all reserved areas 221, 222, and 223. For example, areas 223 of the L1 and L2 in the same radius as the OPC3 204 allocated to the L3 are all reserved. In this example, a permanent information and control data (PIC) area 231 on the L0 is an exception because, unlike an area having wobbled grooves, the PIC area 231 has high frequency modulated (HFM) grooves, and thus, may ignore the influence of an OPC area of an upper layer.

Furthermore, in order to manage recording/reproducing of an information storage medium, temporary disc (or defect) management areas (TDMAs), for example, TDMA0 241, TDMA1 242, TDMA2 243, and TDMA3 244, defect management areas (DMAs), physical access control (PAC) areas, drive areas, and control data zones are allocated.

In FIG. 2, the TDMA0 241 through TDMA3 244 are aligned on the L0 through L3, respectively, and are allocated so as not to intervene or overlap the OPC0 201 through OPC3 204 that are allocated to the L0 through L3. That is, the TDMA0 241 through TDMA3 244 are aligned at an outer side of the OPC0 201 that is aligned at the outermost side from an inner circumference toward an outer circumference from among the OPC0 201 through OPC3 204. In this example, because TDMAs are aligned in a separate space without being influenced by OPC areas, a more simple structure may be achieved and safety may be ensured when using the OPC areas. However, a lead-in area may need a high capacity to separately align the TDMAs.

If OPC areas, TDMAs, DMAs, PAC areas, drive areas, and control data zones are allocated to a 22.512 mm radius, a start of a data zone may be determined according to the density of recording lines and the sizes of OPC areas, buffer zones, TDMAs, and information zones such as INFO1 and INFO2 that are allocated for disc management.

Consequently, a radius r from which a data zone starts may be determined to satisfy the following equation.

$$\pi*(r^2-y^2) = \text{"Channel bit \# of RUB"} * \text{"\# of RUBs in between } y \text{ and } r\text{"} * \text{"Track Pitch"} * \text{"Channel bit length"}.$$

In this example, $\pi=3.141592$, y=PIC start radius, and "# of RUBs in between y and r"=the number of recording unit blocks (RUBs) of wobbled grooves.

The start of the data zone may be determined according to the sizes of OPC areas, TDMAs, buffer zones, and information zones (the number of RUBs may also be referred to as a size).

In FIG. 2, neighboring areas of the OPC0 201 on the same layer, i.e., the L0, are different areas. For example, a neighboring area of the OPC0 201 that is toward the inner circumference is the buffer zone0 211 while a neighboring area toward the outer circumference is the INFO2. As described herein, if a neighboring area of an OPC area is used, for example, if the neighboring area is used to store predetermined data, excessive power may be supplied to the OPC area and thus, in a test process, neighboring areas of the OPC area on the same layer are likely to be damaged.

To prevent damage, at least two tracks (located 0.64 um from the center of a beam because a track pitch is 0.32 um) may be used as a buffer zone, and the buffer to zone may be formed in start and/or end portions of an OPC area or in a neighboring area of the OPC area by using an appropriate number of RUBs based on the density of lines. In a 32 GB or 33 GB Blu-ray disc (BD), because a track includes 2.6 to 2.8 RUBs (1932*498 channel bits) in a radius between 22.5 mm and 24.5 mm, at least six RUBs may be used as a buffer zone.

Figure 3:
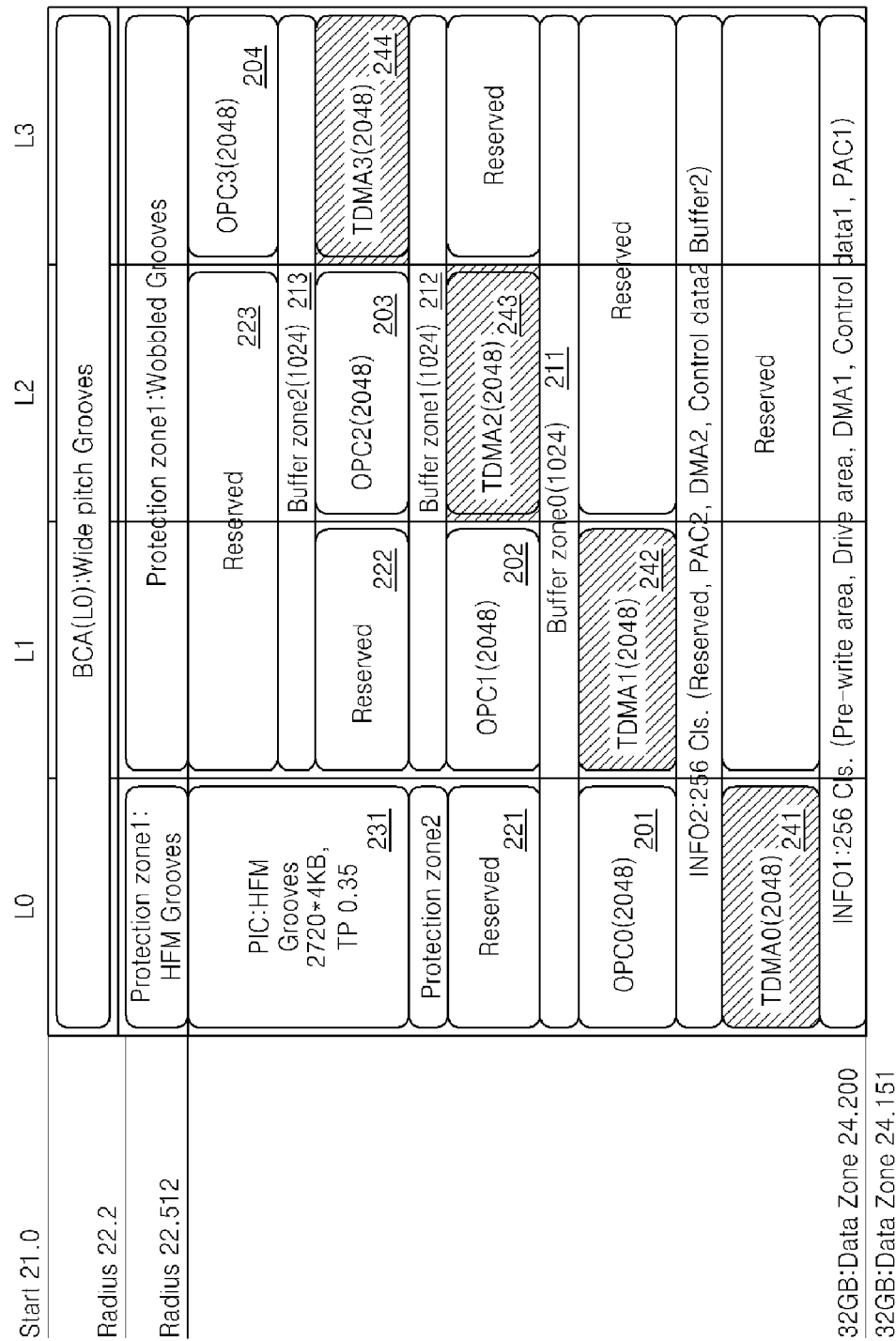
FIG. 3 is a diagram illustrating a second example of a layout of a BD-R TL/QL (32 GB/L or 33 GB/L).

FIG. 3 illustrates a second example of a layout of a BD-R TL/QL (32 GB/L or 33 GB/L).

In FIG. 3, the alignment of OPC areas is the same as and the alignment of TDMAs is different from that of FIG. 2. In FIG. 3, the alignment of TDMAs is shaded. Although the TDMAs are aligned in a separate section from a section in which the OPC areas are aligned in FIG. 2, in FIG. 3, a TDMA of each layer is aligned adjacent to an OPC area of the layer across a buffer zone. In this example, in correspondence with the OPC2 203, the reserved area 222 is aligned on a lower layer, i.e., the L2, and the TDMA3 244 is aligned on an upper layer, i.e., the L3. The above alignment is enabled because an optical beam that is incident on an upper layer may influence a lower layer of a target layer more than the upper layer. For example, if a test recording is performed on the OPC2 203 of the L2, an optical beam for the test recording may influence the L1 a significant amount and may only slightly influence the L3. Accordingly, the TDMA3 244 may be aligned on the L3 that is only slightly influenced.

As such, a capacity required for a lead-in area may be reduced.

Figure 4:
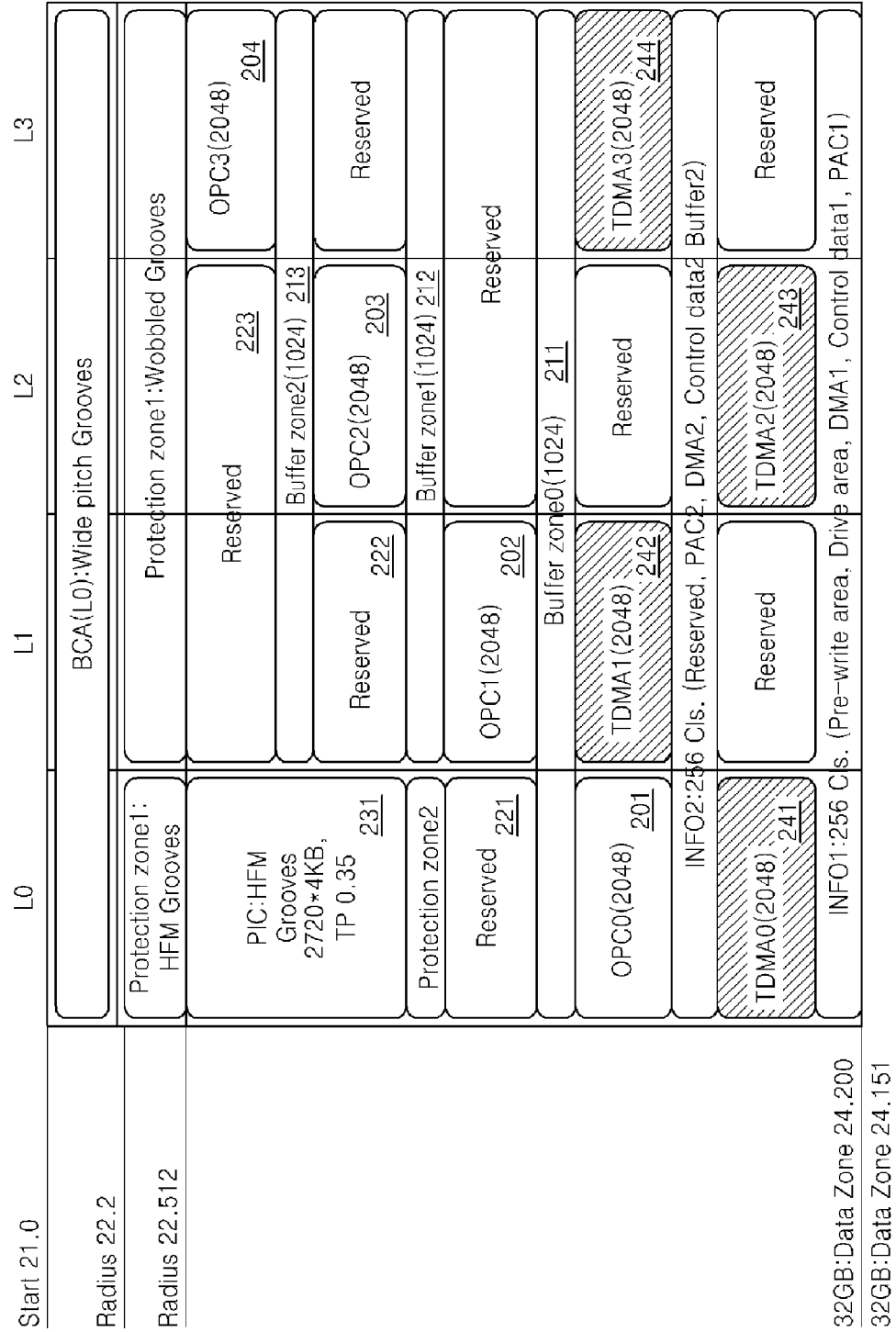
FIG. 4 is a diagram illustrating a third example of a layout of a BD-R TL/QL (32 GB/L or 33 GB/L).

FIG. 4 illustrates a third example of a layout of a BD-R TL/QL (32 GB/L or 33 GB/L).

The layout of FIG. 4 is the same as that of FIG. 3 except for the alignment of the TDMA2 243 and TDMA3 244. Because the L0 has a heat sink, heat is transferred in one direction, and the TDMA1 242 is aligned on a corresponding area of the L1. However, because heat is transferred in two directions on the L1 through L3, the TDMA2 243 and TDMA3 244 are aligned not to correspond to the OPC1 202 and OPC2 203.

Figure 5:
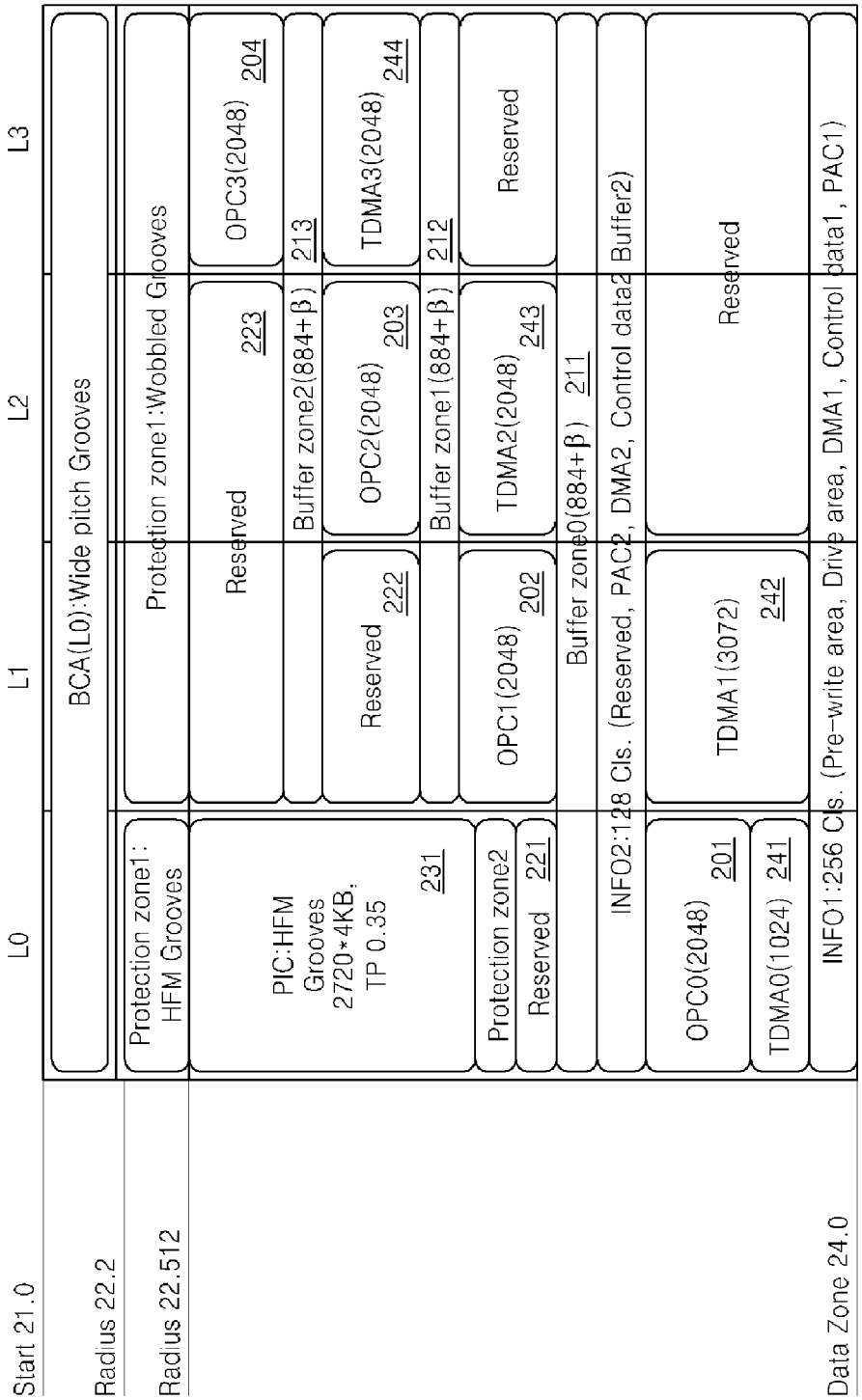
FIG. 5 is a diagram illustrating a fourth example of a layout of a BD-R TL/QL (32 GB/L or 33 GB/L).

FIG. 5 illustrates a fourth example of a layout of a BD-R TL/QL (32 GB/L or 33 GB/L).

The layout of FIG. 5 is the same as that of FIG. 3 except for the alignment of the TDMA0 241 and TDMA1 242. That is, in order to be compatible with a conventional disc standard that defines a data zone that starts from a 24.0 mm radius of a disc, the size of the TDMA0 241 may be reduced to 1024 bytes, and the size of the TDMA1 242 may be increased by the reduced size of the TDMA0 241, for example, to 3072 bytes. FIG. 5 shows an example of 32 GB/L. In the 32 GB/L, a value β is added to the buffer zone0 211, buffer zone1 212, and buffer zone2 213. The value β represents the number of added RUBs.

Figure 6:
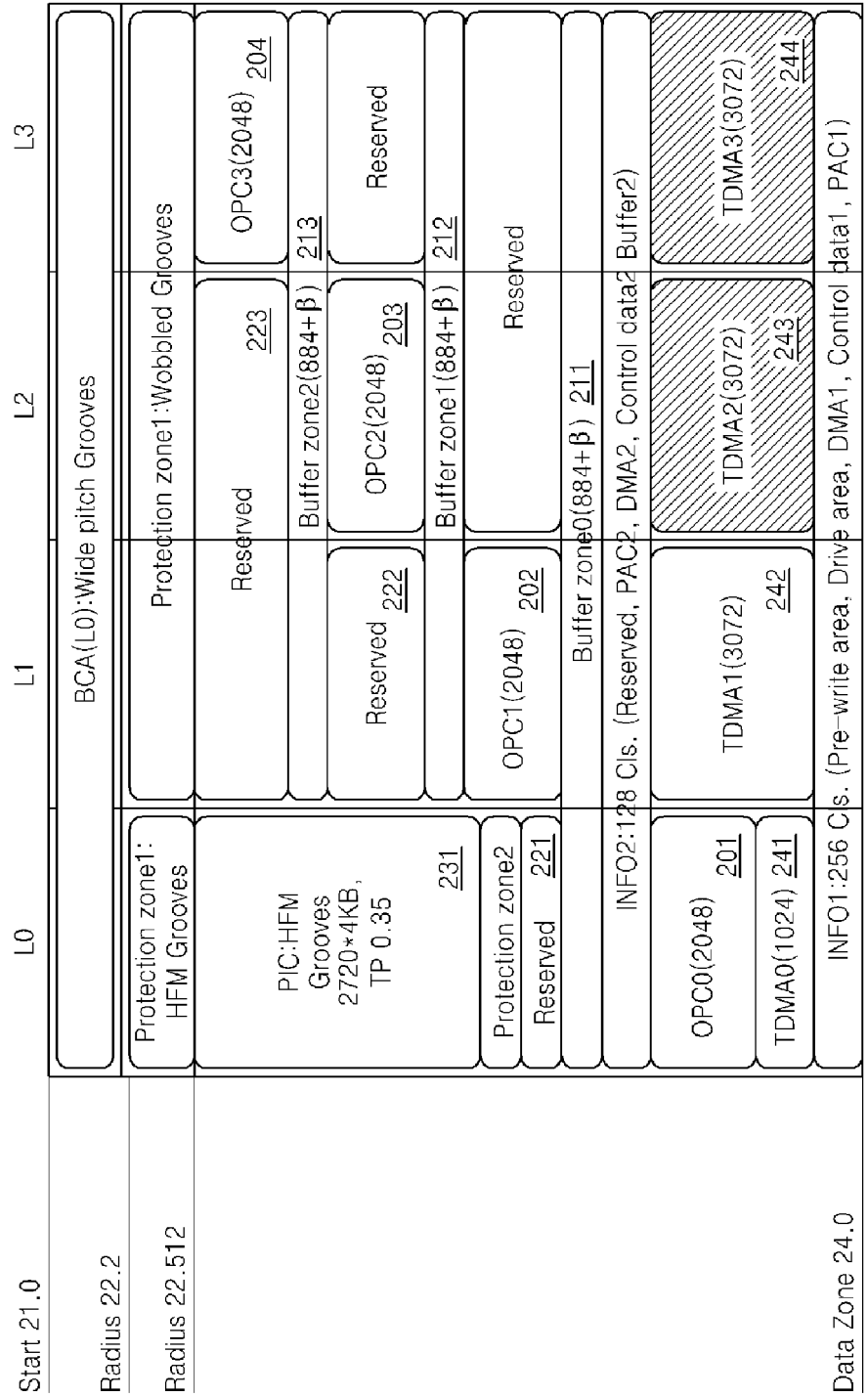
FIG. 6 is a diagram illustrating a fifth example of a layout of a BD-R TL/QL (32 GB/L or 33 GB/L).

FIG. 6 illustrates a fifth example of a layout of a BD-R TL/QL (32 GB/L or 33 GB/L).

The layout of FIG. 6 is the same as that of FIG. 5 except for the alignment of the TDMA2 243 and TDMA3 244 as indicated by the shaded areas. As described herein in relation to FIG. 4, because the L0 has a heat sink and heat is transferred in one direction, the TDMA1 242 is aligned on a corresponding area of the L1. However, because heat is transferred in two directions on the L1 through L3, the TDMA2 243 and TDMA3 244 are aligned not to correspond to the OPC1 202 and OPC2 203.

Figure 7:
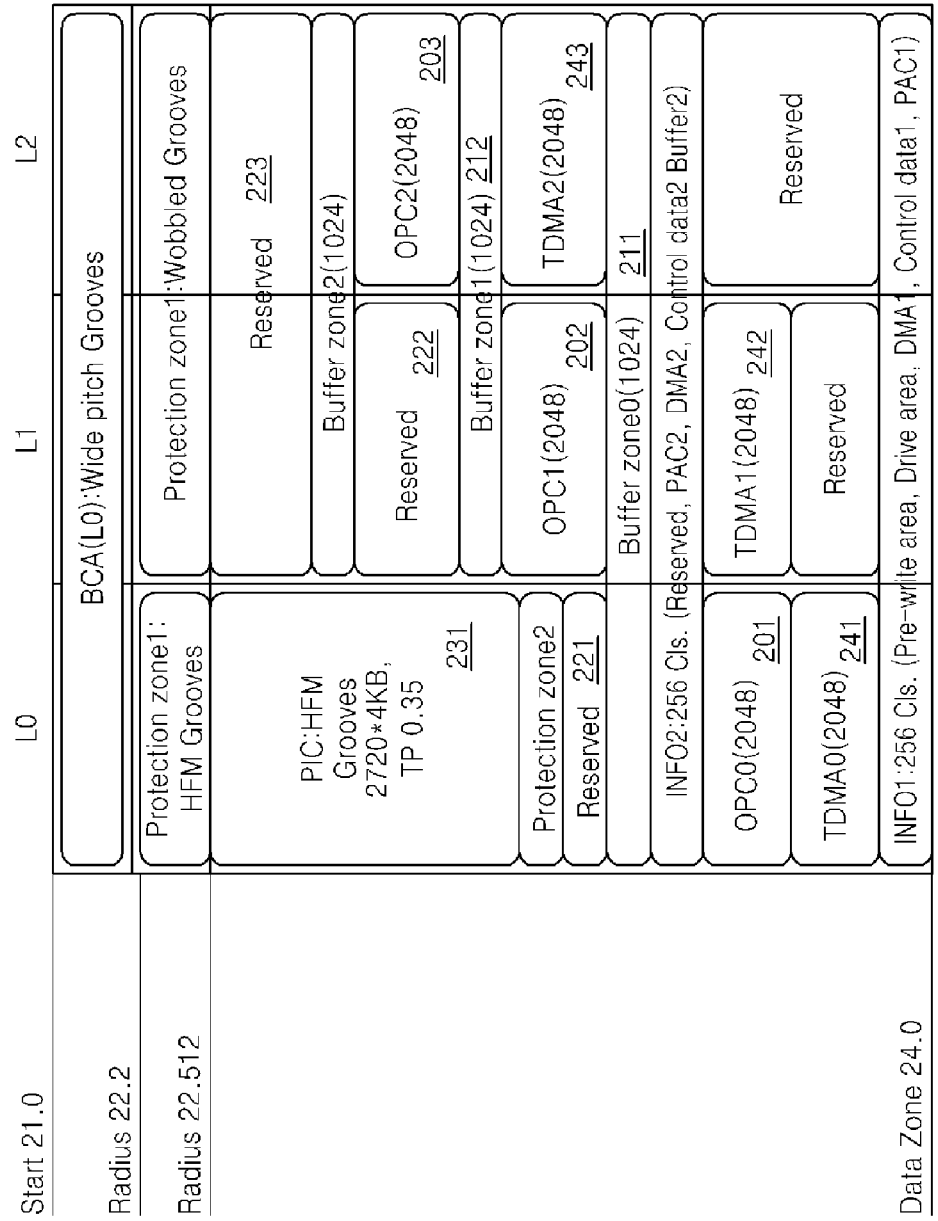
FIG. 7 is a diagram illustrating a first example of a layout of a BD-R TL (32 GB/L or 33 GB/L).

FIG. 7 illustrates a first example of a layout of a BD-R TL (32 GB/L or 33 GB/L).

The layout of FIG. 7 is the same as that of FIG. 3 except that the L3 is not aligned because FIG. 7 shows a TL disc.

Figure 8:
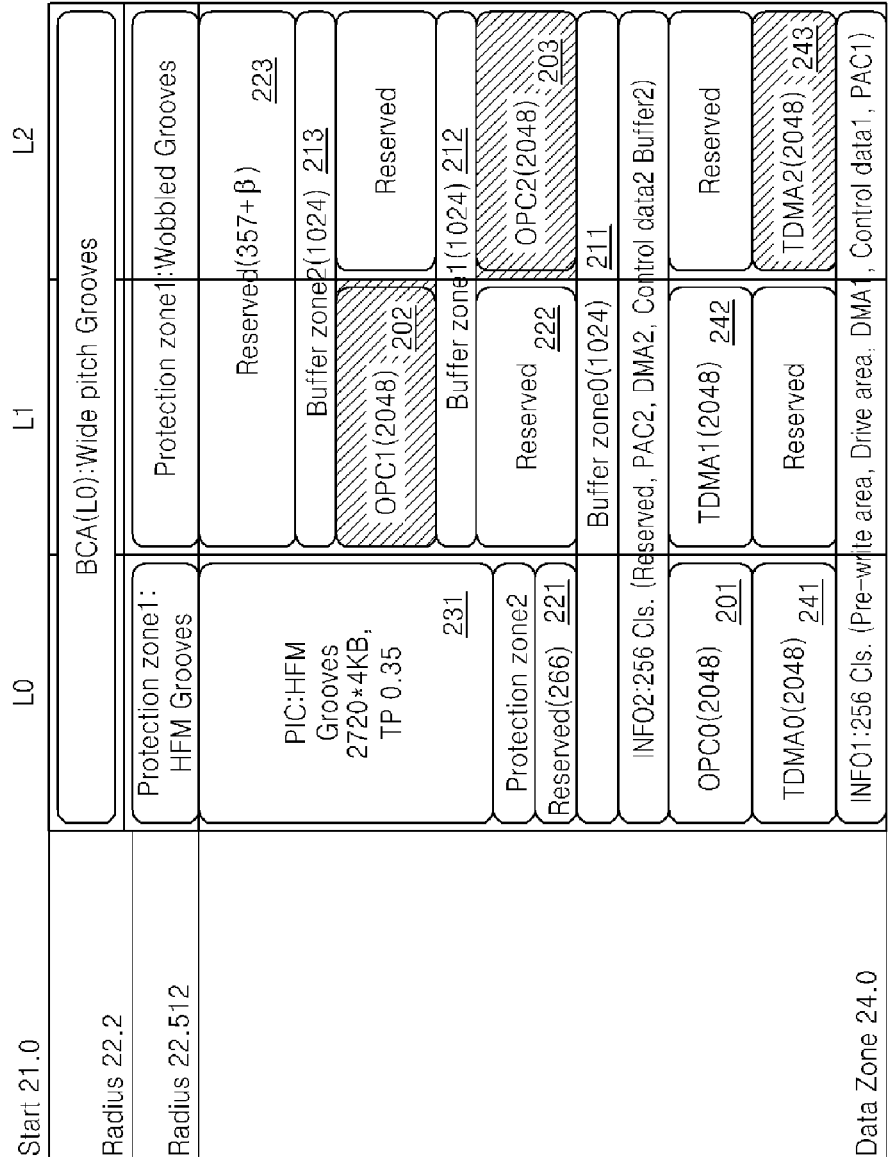
FIG. 8 is a diagram illustrating a second example of a layout of a BD-R TL (32 GB/L or 33 GB/L).

FIG. 8 illustrates a second example of a layout of a BD-R TL (32 GB/L or 33 GB/L).

The layout of FIG. 8 is the same as that of FIG. 7 except for the alignment of the TDMA2 243. As described herein in relation to FIGS. 4 and 6, because the L0 has a heat sink and heat is transferred in one direction, the TDMA1 242 is aligned on a corresponding area of the L1. However, because heat is transferred in two directions on the L1 through L2, the TDMA2 243 is aligned not to correspond to the OPC1 202. The alignment of the OPC1 22 and OPC2 23 is also different from that of FIG. 7.

Figure 9:
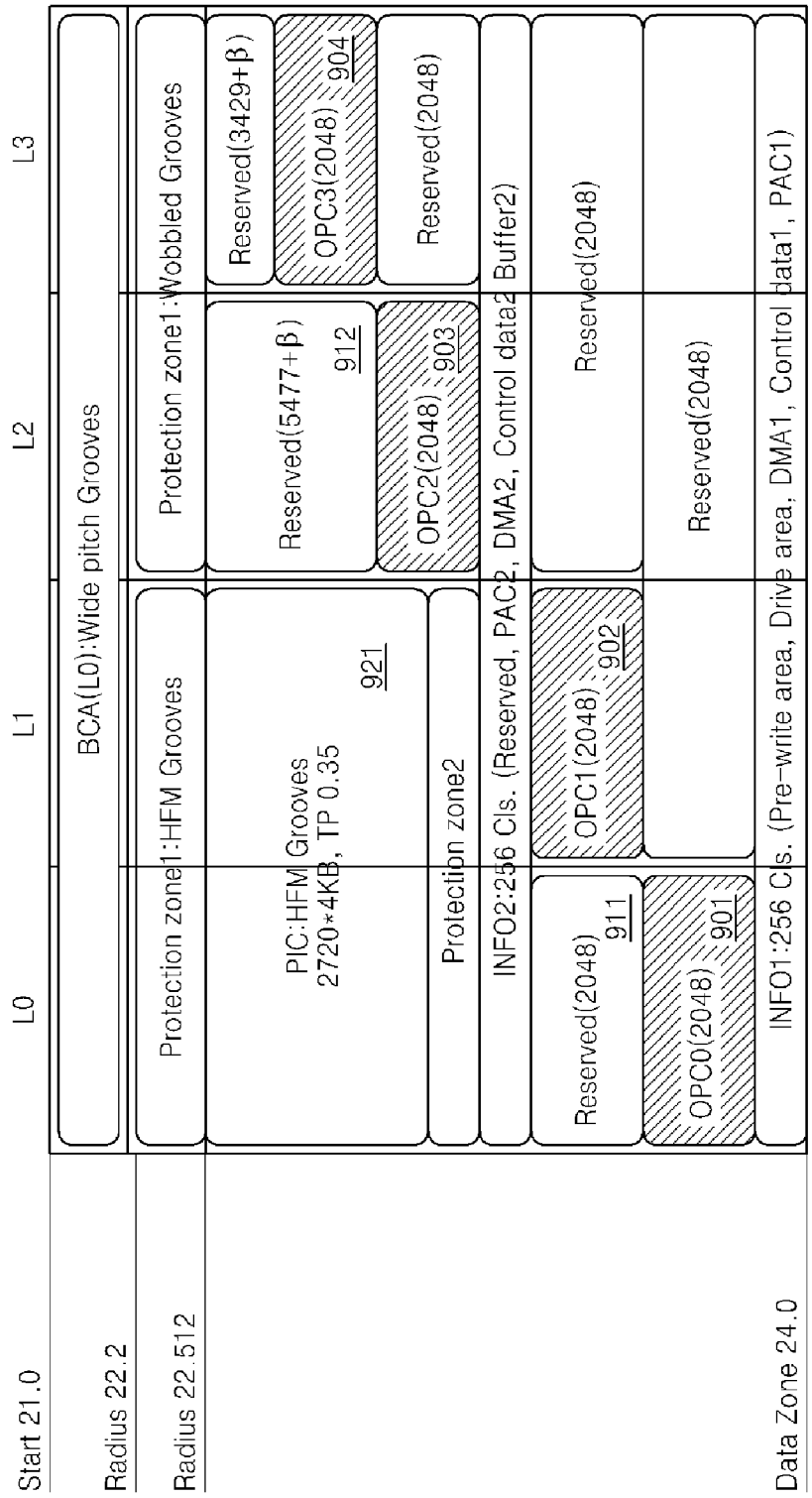
FIG. 9 is a diagram illustrating a first example of a layout of a Blu-ray disc rewritable (BD-RE) TL/QL (32 GB/L or 33 GB/L).

FIG. 9 illustrates a first example of a layout of a BD-RE TL/QL (32 GB/L or 33 GB/L).

A BD-R disc allows only one-time recording and does not allow rewriting, and a BD-RE disc allows rewriting. Because TDMAs are used to temporarily record information used to manage recording and reproducing of a BD-R disc, a BD-RE disc does not need TDMAs.

Accordingly, the layout of FIG. 9 is similar to the layouts of FIGS. 2 through 6 except that TDMA areas are not aligned and a PIC area 921 is aligned on the L0 and also on the L1. A BD-RE dual layer (DL) does not have buffer zones. Although a BD-RE disc does not need buffer zones due to their characteristics, in order to use the structure of a BD-R TL, a BD-RE TL may use buffer zones of the BD-R TL as reserved areas.

Figure 10:
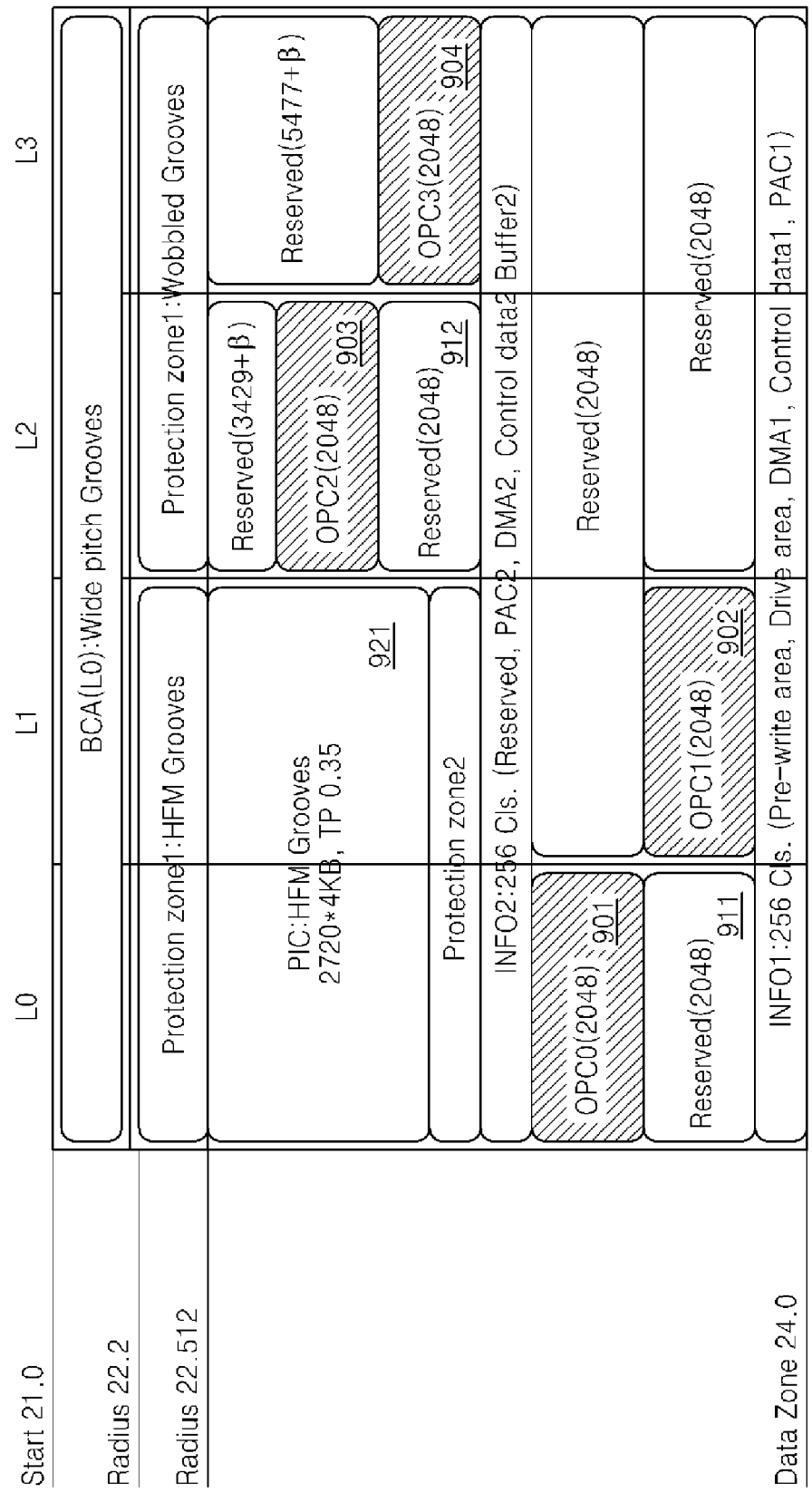
FIG. 10 is a diagram illustrating a second example of a layout of a BD-RE TL/QL (32 GB/L or 33 GB/L).

FIG. 10 illustrates a second example of a layout of a BD-RE TL/QL (32 GB/L or 33 GB/L).

The layout of FIG. 10 is the same as that of FIG. 9 except for the alignment of OPC0 901, OPC1 902, OPC2 903, and OPC3 904.

In the above layouts of FIGS. 2 through 10, the size of each area may vary. For example, the size of an OPC area is 2048 bytes and the size of a TDMA is also mostly 2048 bytes in FIGS. 2 through 10, however, the sizes of areas may be changed, for example, based on a total capacity of a disc.

If an OPC area is allocated to each recording layer in a recording medium including a plurality of layers, a lack of lead-in capacity may occur. Examples of an effective arrangement of a lead-in area are described in view of the lack of lead-in capacity with reference to FIGS. 11 to 19.

FIG. 11 is a table that illustrates an example of reference disc parameters with respect to a capacity of each layer.

Referring to FIG. 11, capacity structures include, for example, a 25 GB/L structure 1110 that has 25 GB per layer, a 32 GB/L structure 1120 that has 32 GB per layer, and a 33.4 GB/L structure 1130 that has 33.4 GB per layer.

For example, reference disc parameters include a track pitch, a RUB (recording unit block) size, pi, a start radius of an information zone/PZ1, a start radius of a recordable zone/PIC, a range of a data zone, a channel bit length, a data zone capacity, and a lead-in capacity. In this example, PZ1 denotes a protection zone 1.

FIG. 12 is a reference table that illustrates an example of an insufficient inner zone capacity of a high capacity blu-ray disc-recordable quadruple layer (HC BD-R QL).

In an example in which an OPC area for each layer is used, an OPC buffer zone due to an inner diameter tolerance (max 0.2 nm) of a data zone is used, and at least one TDMA area are used, a lead-in capacity for a 4 layer disc (a QL disc) may be insufficient as shown in FIG. 12.

For example, if the OPC area and a buffer area are allocated to different radiuses, and an OPC buffer size is calculated at a radius of 23.5~23.6 mm, the 32 GB/L structure 1120 has an insufficient lead-in capacity. In FIG. 12, X is 826 in a QL (the 4 layer disc) and 861 in a TL (a 3 layer disc).

The 25 GB/L structure 1110 is not problematic because a necessary lead-in capacity is 9472 RUBs, and an actual lead-in capacity is 9479 RUB. The 33.4 GB/L structure 1130 is not problematic because the necessary lead-in capacity is 10426 RUBs, and the actual lead-in capacity is 12656 RUBs. However, the 32 GB/L structure 1120 has an insufficient lead-in capacity because the necessary lead-in capacity is 13230 RUBs, and the actual lead-in capacity is 12134 RUBs.

An example of an inner zone layout that solves the insufficient lead-in capacity is described herein. An inner zone and a lead-in area have the same meaning.

Inner zone layout option 1:

Option 1 uses the same inner zone layout structure for both TL and QL discs. In this example, a start radius of the PZ1 is maintained. PIC areas are allocated to L0 and L1. No PIC area is allocated to L2. A start radius of the data zone is maintained. A TDMA0 size is reduced from 2048 to 1024. TDMA areas are reserved for an RE disc. An INFO02 size is reduced from 256 to 128. A reserved 128 RUB is removed from the INFO02. The OPC buffer zone for covering tolerance of a radius diameter of the data zone is allocated. The OPC buffer zone for an R disc is reserved for the RE disc.

Figure 13:
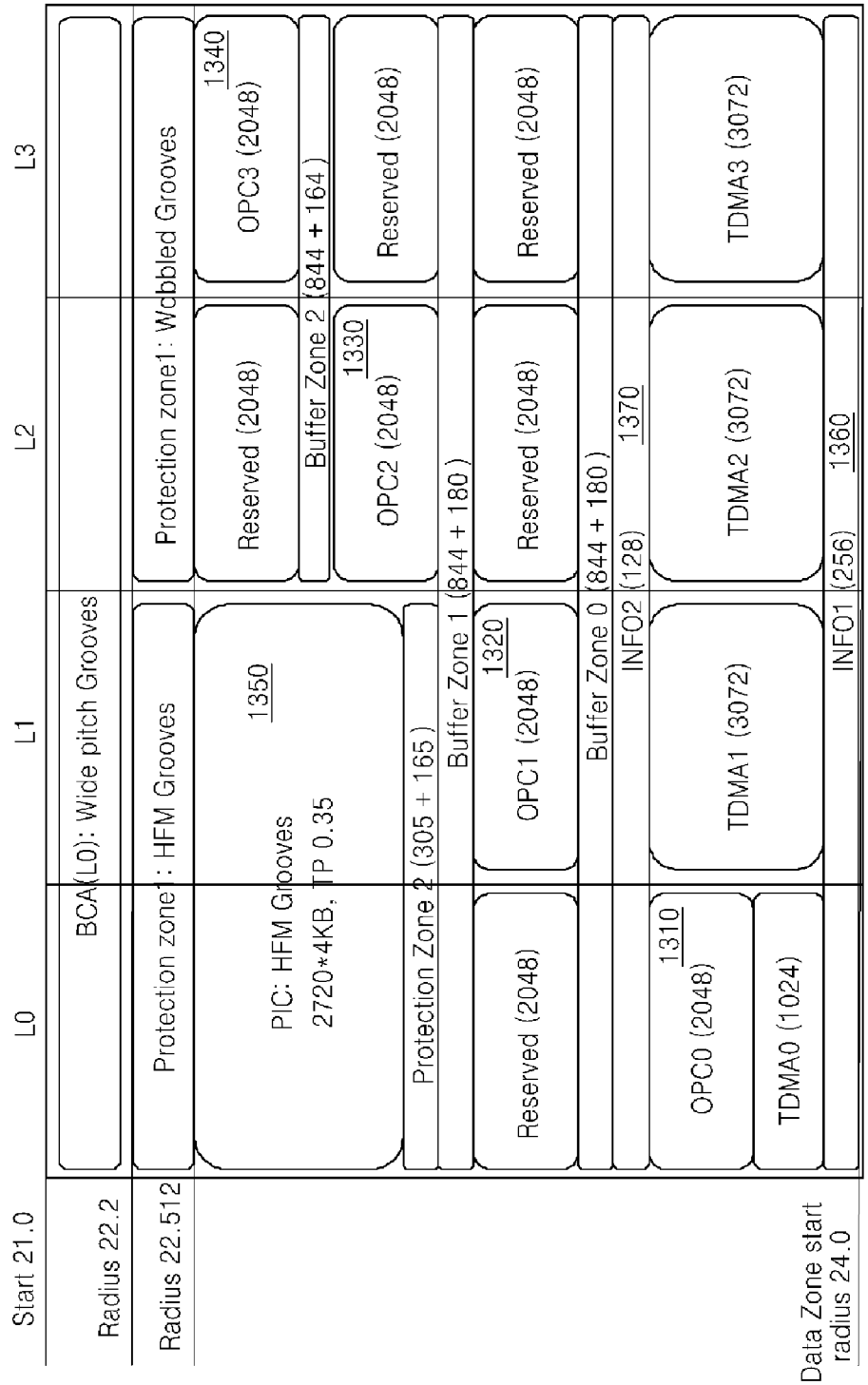
FIG. 13 is a diagram illustrating an example of an inner zone layout option 1.

FIG. 13 illustrates an example of an inner zone layout option 1.

Referring to FIG. 13, a TDMA area and a buffer zone are reserved in an RE disc. No TDMA is necessary in the RE disc, i.e. a rewritable disc, and thus areas indicated as TDMA and areas indicated as the buffer zone may be reserved areas in FIG. 13.

In a TL disc (RE/R 33.4 GB/L), a plus added value is added to the buffer zone, and L3 is removed. In this example, because the TL disc has a 3 layer structure, unnecessary L3 is removed, and a buffer zone capacity has a value that is obtained by summing the plus added value. For example, a capacity of a buffer zone 2 in the TL disc is 844+164.

Referring to FIG. 13, a PIC area 1350 is allocated to L0 and L1, and OPC areas are allocated to the two recording layer L2 and L3 to which the PIC area 1350 is not allocated. An OPC area 2 1330 that is allocated to L2 and an OPC area 3 1340 that is allocated to L3 are arranged in different radiuses.

The OPC area 3 1340 is allocated within a radius to which the PIC area 1350 is allocated. The OPC area 2 1330 is allocated such that it partially overlaps the radius to which the PIC area 1350 is allocated.

As described herein, an information recording medium includes at least three recording layers in which a PIC area is allocated to at least one recording layer. No PIC area is allocated to at least two recording layers. OPC areas allocated to the at least two recording layers to which no PIC area is allocated are arranged in different radiuses. At least one of the OPC areas that is allocated to the at least two recording layers to which no PIC area is allocated is allocated within a radius of which the PIC area is allocated. In addition, at least one OPC area is allocated to partially overlap within the radius to which the PIC area is allocated, thereby effectively using a capacity of a lead-in area.

FIG. 14 is a table that illustrates an example of INFO 1 1360 and INFO 2 1370 of a HC BD-rewritable (RE) disc.

Referring to FIG. 14, PAC denotes physical access control, DMA denotes a defect management area, and a CD denotes control data. In this example, L3 is removed in a TL disc (RE/R 33.4 GB/L).

FIG. 15 is a table that illustrates an example of INFO 1 1360 and INFO 2 1370 of the HC BD-RE disc.

Referring to FIG. 15, L3 is removed in a TL disc (RE/R 33.4 GB/L).

Inner zone layout option 2:

A TL disc and a QL disc use different inner zone layout structures. In this example, the TL and the QL discs have the following in common:

1) A start radius of the PZ1 is maintained.
2) PIC areas are allocated to L0 and L1. No PIC area is allocated to L2.
3) A TDMA0 size is maintained. TDMA areas are reserved for an RE disc.
4) An OPC buffer zone that covers tolerance of a radius diameter of the data zone is allocated. The OPC buffer zone for an R disc is reserved for the RE disc.

A start radius of the data zone is maintained in a HC BD-RE/R TL disc (33.4 GB/L) inner zone layout. For example, the start radius of the data zone may move from 24 mm to 24.11 mm in an HC BD-R QL disc (32 GB/L) inner zone layout. In this example, a data zone capacity may be 31.97 GB/L.

Figure 16:
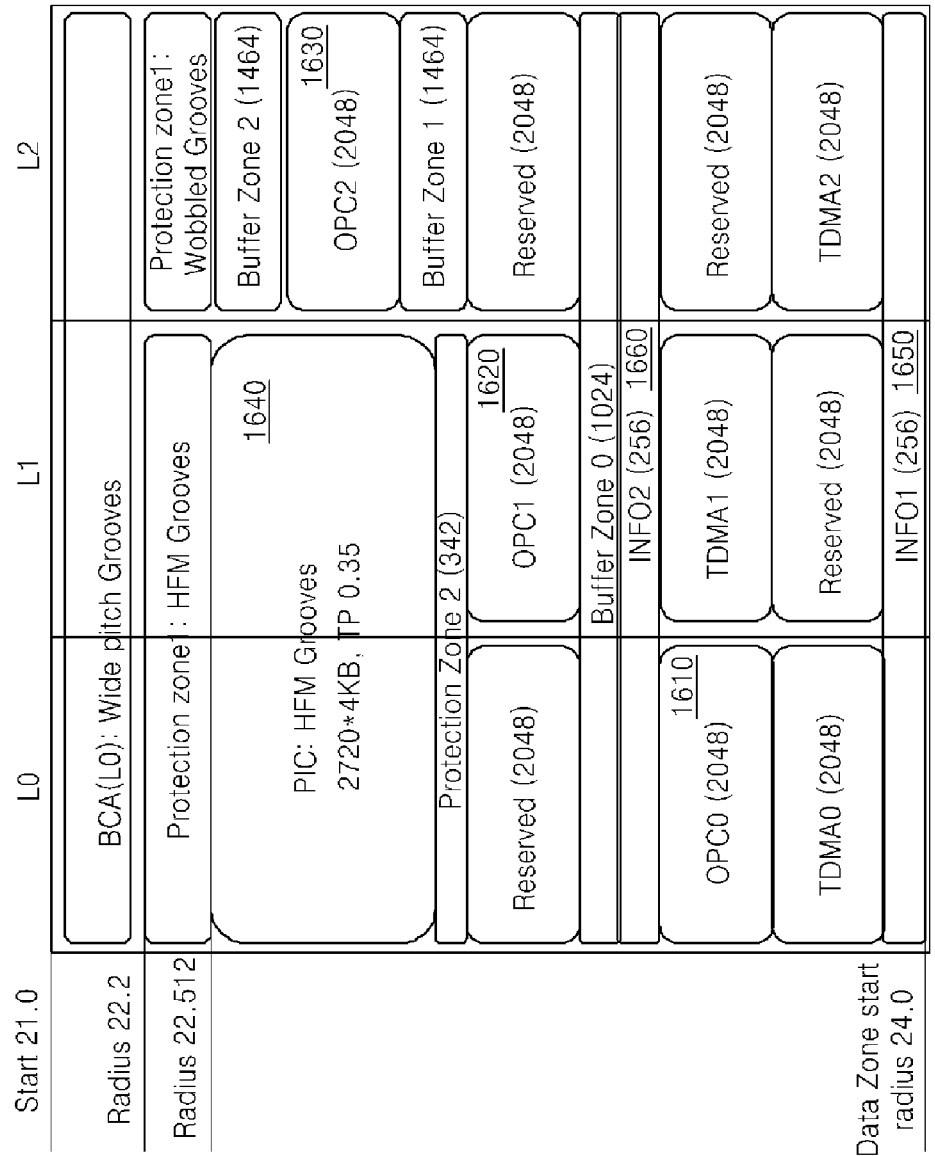
FIG. 16 is a diagram illustrating an example of an inner zone layout option 2 of a RE/R triple layer (TL) disc.

FIG. 16 illustrates an example of an inner zone layout option 2 of a RE/R triple layer (TL) disc.

A TDMA area and a buffer zone are reserved in a RE disc.

Referring to FIG. 16, a PIC area 1640 is allocated to L0 and L1 and is not allocated to L2.

An OPC area 2 1630 that is allocated to L2 is allocated to a radius that is different from that of an OPC area 0 1610 that is allocated to L0 and that of an OPC area 1 1620 that is allocated to L1.

The OPC area 2 1630 allocated to L2 to which the PIC area 1640 is not allocated is allocated within a radius of which the PIC area 1640 is allocated. The OPC area 2 1630 allocated to L2 of which the PIC area 1640 is not allocated may be allocated to partially overlap within the radius of which the PIC area 1640 is allocated.

As described herein, an information recording medium includes at least three recording layers in which PIC areas are allocated to at least two recording layers. In this example, no PIC area is allocated to at least one recording layer. An OPC area that is allocated to the at least one recording layer to which no PIC area is allocated is allocated in a radius different from radiuses of the OPC areas allocated to the at least two recording layers to which the PIC areas are allocated. The PIC areas allocated to the at least two recording layers are allocated to the same radius, and the OPC area, which is allocated to the at least one recording layer to which the PIC area is not allocated, partially overlaps or is allocated in the radius to which at least one of the PIC areas allocated to the at least two recording layers is allocated, thereby effectively using a capacity of a lead-in area.

FIG. 17 is a table that illustrates an example of INFO 1 1650 and INFO 2 1660 of a HC BD-rewritable (RE) disc.

In this example, CD denotes control data.

FIG. 18 is a table that illustrates an example of INFO 1 1650 and INFO 2 1660 of a HC BD-R disc.

In this example, CD denotes control data.

Figure 19:
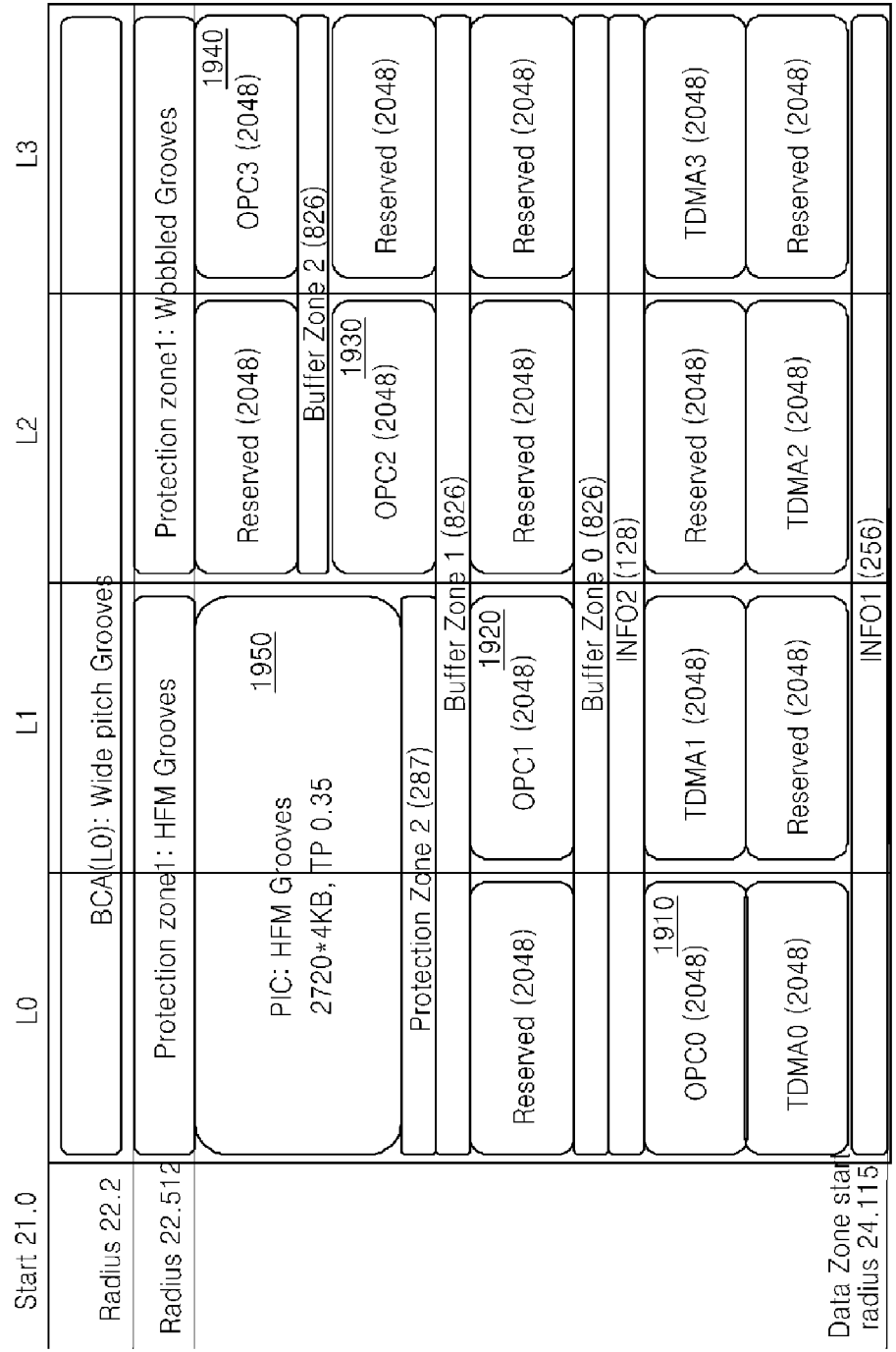
FIG. 19 is a diagram illustrating an example of an inner zone layout option 2 of an R QL disc.

FIG. 19 illustrates an example of an inner zone layout option 2 of an R QL disc.

The layout of FIG. 19 is similar to the layout of FIG. 13, except for a TDMA arrangement, a start radius of a data zone, a buffer size, and the like.

An information recording medium including defect management generally includes a spare area to linearly replace a defect that occurs in a user data area. If the defect that occurs in the user data area is contiguous, the defect may be contiguously replaced in the spare area, and such a replacement is indicated as a contiguous defect entry, thereby reducing a size of defect information.

Figure 20:
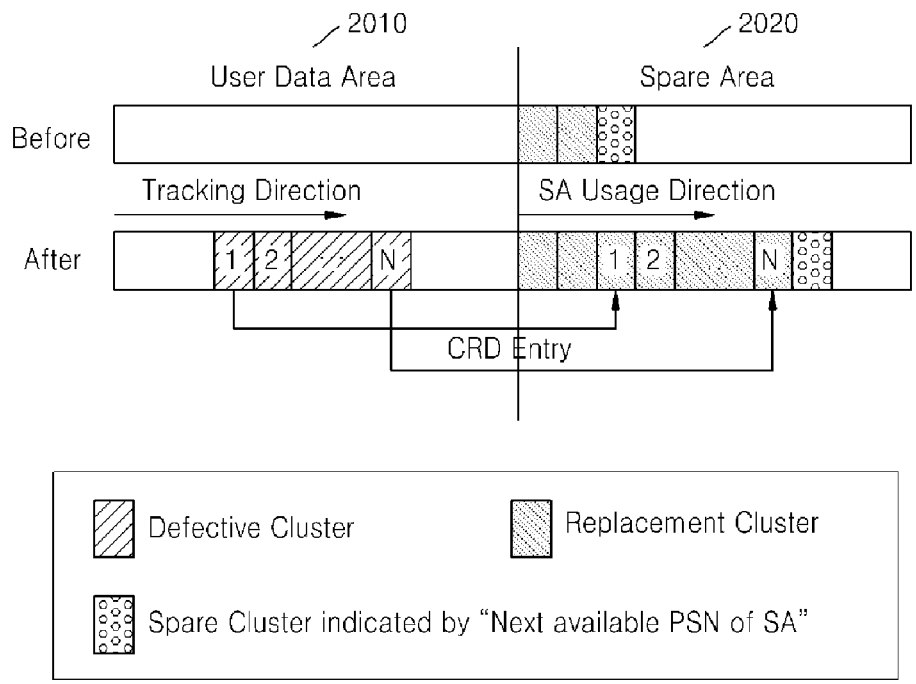
FIG. 20 is a diagram illustrating an example of a contiguous defect to replacement in a spare area when a direction in which a user data area is used is the same as a direction in which the spare area is used.

FIG. 20 illustrates an example of a contiguous defect replacement in a spare area when a direction in which a user data area 2010 is used is opposite to a direction in which the spare area 2020 is used.

Referring to FIG. 20, before contiguous defects occur, two replacement clusters exist in a spare area 2020, and a cluster next to the two clusters indicates a spare cluster that is designated as a "next available PSN in the spare area 2020".

After the contiguous defects occur, 1 through N defect clusters occur in a user data area 2010, and thus, 1 through N replacement clusters contiguously replace the 1 through N defect clusters.

If the direction (a tracking direction) in which the user data area 2010 is used and the direction in which the spare area 2020 is used, are the same, data may be recorded in the contiguous replacement clusters 1 through N of the spare area 2010 in the tracking direction. As another example, the spare area 2020 may be allocated by changing a size of the spare area 2020 during an initialization or formatting process, and may be expanded while being used. That is, the size of the spare area 2020 may be flexible.

A file system for managing user data is generally stored in the beginning and end of a volume space that stores the user data that is stored in the head of the volume space. In this example, the spare area 2020 may be easily expanded by making a recording direction of the user data opposite to a use sequence of the spare area 2010. In this example, the recording (tracking) direction of the user data on a disc and a direction in which the expandable spare area is used are opposite to each other.

In some examples, if the recording direction of the user data and the use in which the expandable spare area is used are different from each other, it may be difficult to replace a contiguous defect because the user data is mainly recorded in the tracking direction, whereas the spare area is used in a direction opposite to the tracking direction.

Figure 21:
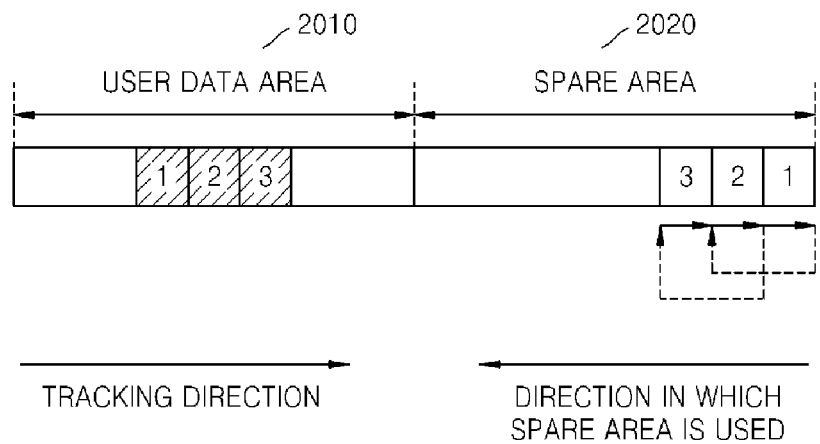
FIG. 21 is a diagram illustrating an example of a contiguous replacement recording status when a direction in which a user data area is used is opposite to a direction in which a spare area is used.

FIG. 21 illustrates an example of a contiguous replacement recording status when a direction in which a user data area is used is opposite to a direction in which a spare area 2020 is used.

Referring to FIG. 21, if defect clusters 1, 2, and 3 contiguously occur in a user data area 2010, data is recorded in contiguous replacement clusters 1, 2, and 3 in the spare area 2020 to replace the contiguous defect clusters 1, 2, and 3. In this example, because the directions in which the user data area 2010 and the spare area 2020 are used are opposite to each other, the data is recorded from the rightmost replacement cluster to second and third replacement clusters.

However, because a tracking direction is still from the left to the right, the data is recorded from the left to the right in each of the contiguous replacement clusters 1, 2, and 3. That is, the data is recorded from the left most of the replacement cluster 1 of the spare area 2020 to the right, if the data is completely recorded in the replacement cluster 1, a pickup jumps to the leftmost of the replacement cluster 3, and thus the data is recorded from the leftmost of the replacement cluster 3 to the right.

Therefore, if the direction in which the spare area 2020 is used is opposite to the tracking direction, the pickup jumps even after the data is recorded in each of the contiguous replacement clusters 1, 2, and 3, which takes much time in recording the data, and thus efficiency is greatly reduced. This applies when the data is reproduced. For example, when the data is reproduced, although the data is contiguously replaced, the pickup jumps after the replacement cluster 1 is reproduced. After the replacement cluster 2 is reproduced, the pickup jumps again, and the replacement cluster 3 is reproduced, which takes much time in reproducing the data. Thus, a method of reducing time taken when the tracking direction and the direction in which the spare area 2020 is used are opposite to each other is described herein.

Figure 22:
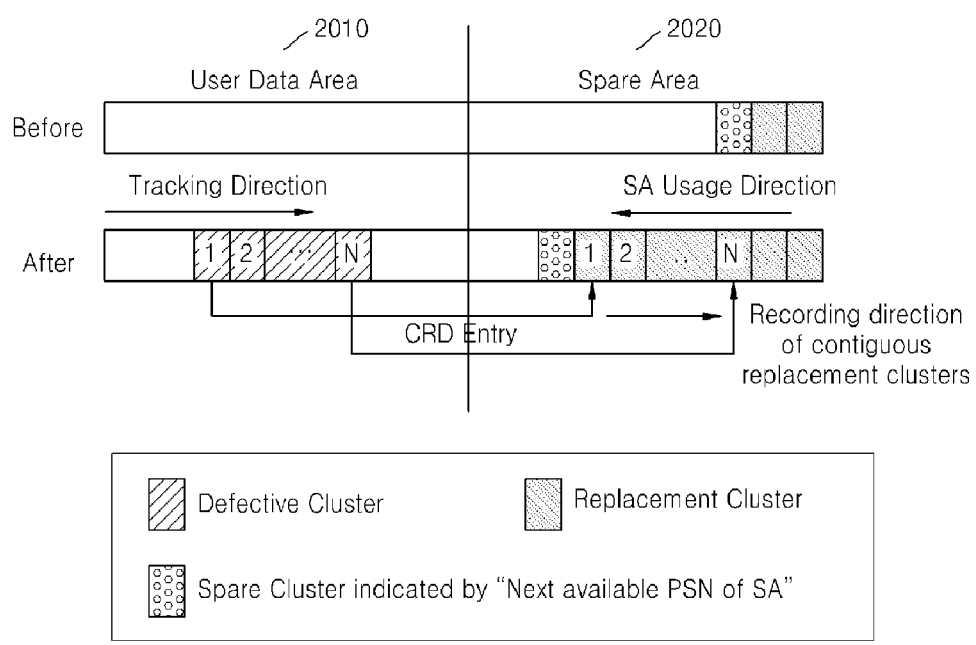
FIG. 22 is a diagram illustrating an example of a method of reducing time for contiguous defect replacement recording when a tracking direction is opposite to a direction in which a spare area is used.

FIG. 22 illustrates an example of a method of reducing time for contiguous defect replacement recording when a tracking direction is opposite to a direction in which the spare area 2020 is used.

Before contiguous defects occur, two replacement clusters exist in the spare area 2020, and a cluster next to the two clusters indicates a spare cluster designated as a "next available PSN in the spare area 2020".

After the contiguous defects occur, 1 through N defect clusters occur in the use data area 2010, and thus 1 through N replacement clusters contiguously replace the defect clusters 1 through N. Because a drive previously knows that a contiguous defect has occurred, the drive knows the total size of the 1 through N replacement clusters. Accordingly, the drive knows what clusters of the spare area 2020 are to be determined as contiguous replacement clusters. In this example, the drive determines a start cluster and an end cluster of the contiguous replacement clusters, and records data from the left to the right within the range of the start cluster and the end cluster in the tracking direction. That is, referring to FIG. 22, the data is recorded to the replacement cluster N by recording the data in the replacement cluster 2 after recording the data in the replacement cluster 1.

FIGS. 23 through 26 illustrate a recording/reproducing apparatus using an information storage medium and flowcharts of methods of recording and reproducing data onto and from the information storage medium apparatus according to an embodiment of the present invention. The recording/reproducing apparatus and method relating to the information storage medium are described with reference to FIGS. 23 through 26.

Figure 23:
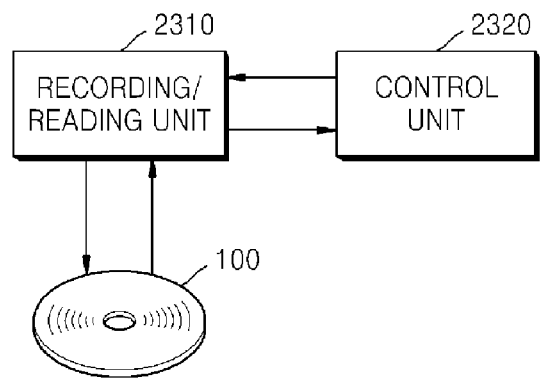
FIG. 23 is a diagram illustrating an example of a recording/reproducing apparatus.

FIG. 23 illustrates an example of a recording/reproducing apparatus.

Referring to FIG. 23, the recording/reproducing apparatus includes a recording/reading unit 2310 and a control unit 2320.

The recording/reading unit 2310 may record data on and may read data from an information storage medium such as a recording medium 100, by the control of the control unit 2320. The control unit 2320 may control the recording/reading unit 2310 to record or read data on or from the recording medium 100. In a recording process, data may be recorded on the recording medium 100 or test recording may be performed on an OPC area. In a reproducing process, data is read from the recording medium 100.

Figure 24:
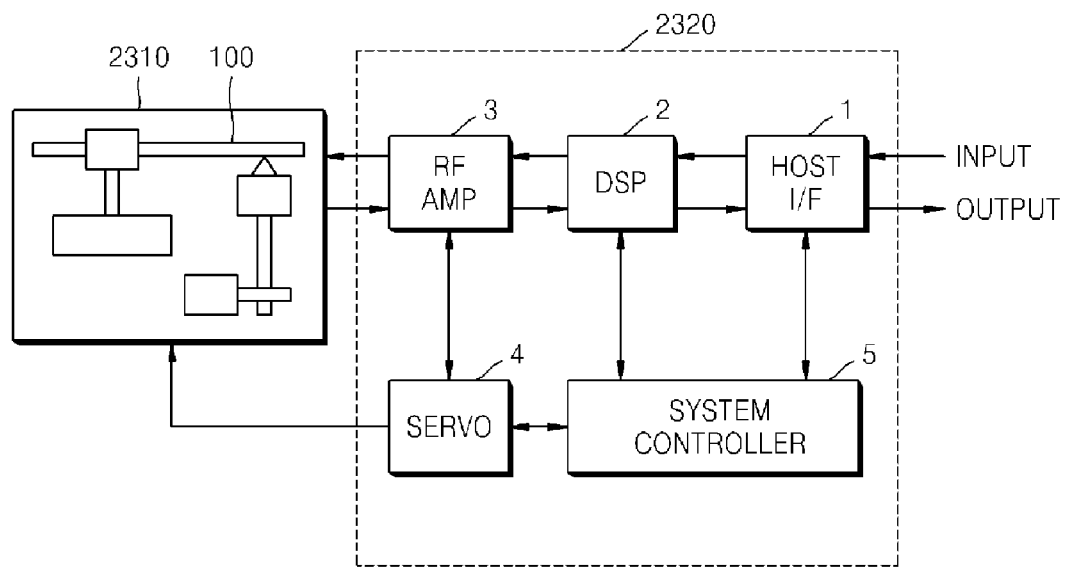
FIG. 24 is a diagram illustrating an example of a drive including the recording/reproducing apparatus illustrated in FIG. 23.
Figure 25:
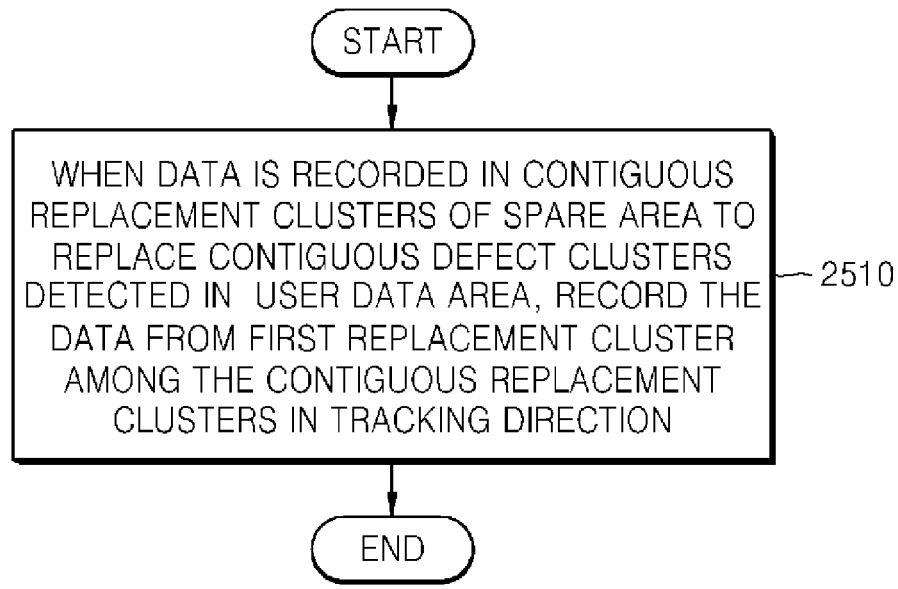
FIG. 25 is a flowchart illustrating an example of a recording method.
Figure 26:
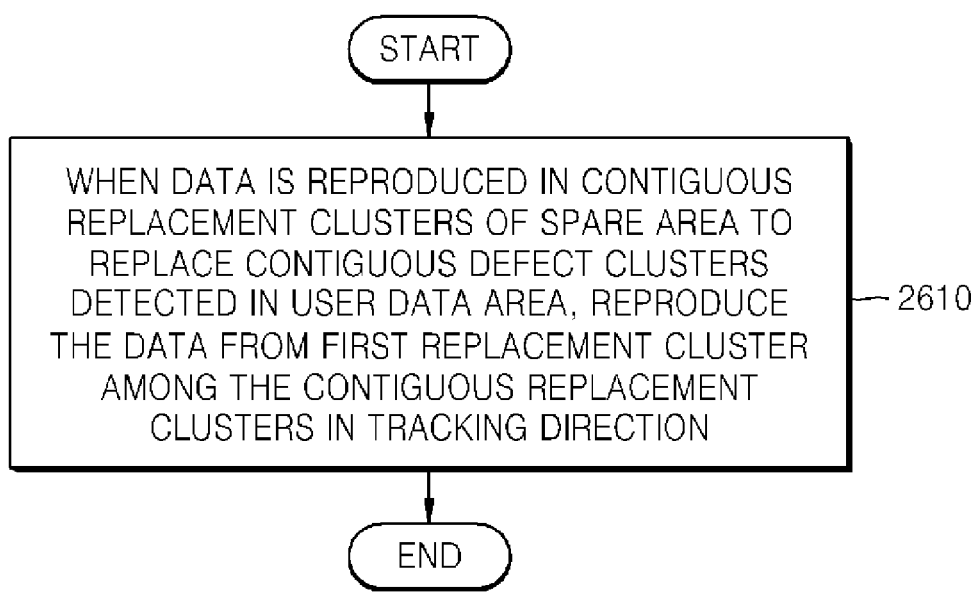
FIG. 26 is a flowchart illustrating an example of a reproducing method.

A recording apparatus and a reproducing apparatus may be separate apparatuses or may be included in the same apparatus as illustrated in FIG. 24.

FIG. 24 illustrates an example of a drive including the recording/reproducing apparatus illustrated in FIG. 23.

Referring to FIG. 24, the drive includes a pickup as the recording/reading unit 2310. The recording medium 100 is mounted on the pickup 2310. Also, the drive includes a host interface (I/F) 1, a digital signal processor (DSP) 2, a radio frequency (RF) amplifier (AMP) 3, a servo 4, and a system controller 5, as the control unit 2320.

In an example of a recording process, the host I/F 1 receives data to be recorded and a recording command from a host (not shown). The system controller 5 performs an initialization process that is used to record the data. The DSP 2 performs error correction (ECC) encoding on the data received from the host I/F 1 by adding auxiliary data such as parity bits, and modulates the ECC encoded data by using a predetermined method. The RF AMP 3 transforms the data that is output from the DSP 2, into an RF signal. The pickup 2310 records the RF signal that is output from the RF AMP 3, on the recording medium 100. The servo 4 receives a command that is used for servo control from the system controller 5 and servo-controls the pickup 2310. For example, the system controller 5 may control data to be recorded onto a recording medium on which OPC areas and TDMA areas are aligned such as the examples of information storage mediums shown in FIGS. 1 through 19.

For example, the system controller 5 may record data onto an information recording medium comprising a user data area for recording user data, and a spare area for replacing a defect detected in the user data area, wherein a tracking direction of the user data area and a direction in which the spare area is used are opposite to each other. The system controller 5 may control a pickup to record the data from a first replacement cluster of the contiguous replacement clusters in a tracking direction when the data is recorded in contiguous replacement clusters of the spare area to replace contiguous defect clusters that are detected in the user data area (operation 2510 of FIG. 25).

In an example of a reproducing process, the host I/F 1 receives a reproducing command from a host (not shown). The system controller 5 performs an initialization process that is used to reproduce data. The pickup 2310 outputs an optical signal that is obtained by radiating a laser beam to the recording medium 100 and receiving the laser beam reflected on the recording medium 100. The RF AMP 3 transforms the optical signal output from the pickup 2310, into an RF signal, provides modulated data obtained from the RF signal, to the DSP 2, and provides a servo signal for control, which is obtained from the RF signal, to the servo 4. The DSP 2 demodulates the modulated data, performs ECC encoding on the demodulated data, and outputs the ECC-encoded data. In this example, the servo 4 receives the servo signal from the RF AMP 3, receives a command required for servo control from the system controller 5, and servo-controls the pickup 2310. The host I/F 1 transmits the data received from the DSP 2, to the host.

In this example, the system controller 5 may control data to be reproduced from the recording medium on which OPC areas and TDMA areas are aligned such as the examples of information storage mediums shown in FIGS. 1 through 19.

Further, the system controller 5 may reproduce data from an information recording medium comprising a user data area for recording user data, and a spare area for replacing a defect detected in the user data area, wherein a tracking direction of the user data area and a direction in which the spare area is used are opposite to each other. The system controller 5 may control a pickup to reproduce the data from a first replacement cluster of the contiguous replacement clusters in a tracking direction when the data is reproduced in contiguous replacement clusters of the spare area to replace for contiguous defect clusters detected in the user data area (operation 2610 of FIG. 26).

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed:

1. An information recording medium comprising:
at least three recording layers,
wherein at least one recording layer comprises a permanent information and control data (PIC) area, at least two recording layers have no PIC area, OPC areas are allocated to the at least three recording layers, and the OPC areas of the at least three recording layers are arranged in different radiuses, and
at least one of the OPC areas allocated to the at least two recording layers that have no PIC area is allocated in a radius to which the PIC area is allocated in the at least one recording layer comprising the PIC area, and at least one other OPC area is allocated to partially overlap the radius to which the PIC area is allocated in the at least one recording layer comprising the PIC area.

2. An information recording medium comprising:
at least three recording layers comprising at least two recording layers that have PIC areas allocated therein, and at least one recording layer that has no PIC area allocated therein,
wherein OPC areas are allocated to the at least three recording layers, and the OPC areas of the at least three recording layers are arranged in different radiuses,
the PIC areas allocated to the at least two recording layers are allocated to the same radius, and
the OPC area allocated to the at least one recording layer that has no PIC area partially overlaps with or is allocated in the radius to which at least one of the PIC areas allocated to the at least two recording layers is allocated.

3. An apparatus for recording and/or reproducing data on/from an information recording medium comprising at least three recording layers, the apparatus comprising:
a pickup for recording and/or reproducing data with respect to the information recording medium; and
a control unit for controlling the pickup to record and/or reproduce the data with respect to the information recording medium,
wherein at least one recording layer comprises a permanent information and control data (PIC) area, at least two recording layers have no PIC area, OPC areas are allocated to the at least three recording layers, and the OPC areas of the at least three recording layers are arranged in different radiuses, and
at least one of the OPC areas allocated to the at least two recording layers that have no PIC area is allocated in a radius to which the PIC area is allocated in the at least one recording layer comprising the PIC area, and at least one other OPC area is allocated to partially overlap the radius to which the PIC area is allocated in the at least one recording layer comprising the PIC area.

4. The information recording medium of claim 1, wherein the at least three recording layers comprise four recording layers, at least three recording layers have no PIC area, and OPC areas are allocated to the at least three recording layers that have no PIC area such that the OPC areas of the at least three recording layers are arranged in different radiuses.

* * * * *